United States Patent
Whittle

(10) Patent No.: US 11,378,012 B2
(45) Date of Patent: Jul. 5, 2022

(54) INSERT-MOUNTED TURBINE ASSEMBLY FOR A GAS TURBINE ENGINE

(71) Applicant: Rolls-Royce plc, London (GB)

(72) Inventor: Michael J. Whittle, London (GB)

(73) Assignee: Rolls-Royce plc

( * ) Notice: Subject to any disclaimer, the term of this patent is extended or adjusted under 35 U.S.C. 154(b) by 108 days.

(21) Appl. No.: 16/712,058

(22) Filed: Dec. 12, 2019

(65) Prior Publication Data
US 2021/0180521 A1    Jun. 17, 2021

(51) Int. Cl.
*F02C 7/28* (2006.01)
*F01D 9/04* (2006.01)
*F01D 25/24* (2006.01)

(52) U.S. Cl.
CPC .............. *F02C 7/28* (2013.01); *F01D 9/041* (2013.01); *F05D 2220/32* (2013.01); *F05D 2230/60* (2013.01); *F05D 2240/12* (2013.01); *F05D 2240/55* (2013.01)

(58) Field of Classification Search
CPC ...... F01D 25/246; F01D 11/08; F01D 11/005; F01D 11/18; F01D 9/04; F01D 25/243; F01D 25/28; F01D 9/041; F02C 7/28; F05D 2220/32; F05D 2230/60; F05D 2240/12; F05D 2240/11; F05D 2240/55; F05D 2300/6033; F05D 2230/642; F05D 2260/30; F05D 2230/64; F16B 33/002; F16B 37/04; F16B 37/061; F16B 39/00; F16B 39/10; F16B 39/24; F16B 41/002; F16B 43/00; B23K 35/0288

USPC ..... 411/166, 171, 347, 352, 360, 371.2, 531
See application file for complete search history.

(56) References Cited

U.S. PATENT DOCUMENTS

| | | | |
|---|---|---|---|
| 5,080,557 A | 1/1992 | Berger | |
| 5,592,814 A * | 1/1997 | Palusis | F02K 1/80 60/770 |
| 6,884,026 B2 | 4/2005 | Glynn et al. | |
| 7,416,362 B2 * | 8/2008 | North | F16B 5/0241 267/150 |
| 7,849,696 B2 * | 12/2010 | De Sousa | F23R 3/007 60/804 |
| 7,874,059 B2 * | 1/2011 | Morrison | F16B 5/0266 29/525.02 |
| 9,551,456 B2 * | 1/2017 | Peters | F16F 15/04 |
| 2006/0292001 A1 | 12/2006 | Keller et al. | |
| 2009/0208284 A1 | 8/2009 | Funnell | |
| 2016/0153299 A1 * | 6/2016 | Tuertscher | F01D 25/246 415/115 |
| 2016/0186999 A1 | 6/2016 | Freeman et al. | |
| 2016/0319688 A1 | 11/2016 | Vetters et al. | |
| 2018/0051581 A1 | 2/2018 | Quennehen et al. | |
| 2018/0291768 A1 * | 10/2018 | Boeck | F01D 25/28 |
| 2018/0291769 A1 | 10/2018 | Vetters et al. | |
| 2018/0340440 A1 | 11/2018 | Freeman et al. | |

\* cited by examiner

*Primary Examiner* — Eric J Zamora Alvarez
(74) *Attorney, Agent, or Firm* — Barnes & Thornburg LLP

(57) ABSTRACT

A turbine assembly adapted for use in a gas turbine engine includes a seal segment and a carrier. The seal segment includes a shroud wall that extends circumferentially partway around an axis and a mount post that extends radially outward away from the shroud wall. The carrier is shaped to define a channel that receives at least a portion of the mount post. A mounting insert is used to urge the carrier and mount post toward one another.

19 Claims, 10 Drawing Sheets

INSERT-MOUNTED TURBINE ASSEMBLY FOR A GAS TURBINE ENGINE

FIELD OF THE DISCLOSURE

The present disclosure relates generally to gas turbine engines, and more specifically to turbine assembly assemblies for use with gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Compressors and turbines typically include alternating stages of static vane assemblies and rotating wheel assemblies. The rotating wheel assemblies include disks carrying blades around their outer edges. When the rotating wheel assemblies turn, tips of the blades move along blade tracks included in static shrouds that are arranged around the rotating wheel assemblies. The static vane assemblies include vanes that are positioned to direct the gases toward the rotating wheel assemblies with a desired orientation. Such static shrouds and vanes may be coupled to an engine case that surrounds the compressor, the combustor, and the turbine.

Some shrouds and vanes positioned in the turbine may be exposed to high temperatures from products of the combustion reaction in the combustor. Such shrouds and vanes sometimes include components made from materials that have different coefficients of thermal expansion. Due to the differing coefficients of thermal expansion, the components of some turbine assemblies expand at different rates when exposed to combustion products. In some examples, coupling such components with traditional arrangements may not allow for the differing levels of expansion and contraction during operation of the gas turbine engine.

SUMMARY

The present disclosure may comprise one or more of the following features and combinations thereof.

A turbine assembly adapted for use in a gas turbine engine may include a seal segment, a carrier, and a mounting insert. The seal segment may comprise ceramic matrix composite materials. The carrier may comprise metallic materials and may be configured to support the seal segment in position radially relative to the axis. The mounting insert may be coupled with the carrier and engaged with the seal segment to bias the seal segment into engagement with the carrier with a predetermined force load.

In some embodiments, the seal segment may include a shroud wall and a mount post. The seal segment may extend circumferentially partway around an axis to define a gas path boundary of the turbine assembly. The mount post may extend radially outward away from the shroud wall.

In some embodiments, the carrier may include an outer wall, a first attachment flange, and a second attachment flange. The outer wall may extend circumferentially at least partway about the axis. The first attachment flange may extend radially inward from the outer wall. The second attachment flange may extend radially inward from the outer wall.

In some embodiments, the second attachment flange may be spaced apart axially from the first attachment flange to define a radially inwardly opening channel. The radially inwardly opening channel may receive the mount post of the seal segment.

In some embodiments, the mounting insert may include an insert body, a protrusion, and a bias member. The insert body may be fixed to the first attachment flange. The protrusion may extend axially between a first end coupled with the insert body and a second end engaged with the mount post of the seal segment. The second end may be spaced apart from the first end to define a receiving space between the first end and the second end of the protrusion. The bias member may located in the receiving space and may be engaged with the insert body and the mount post to apply a force load to the mount post and limit axial movement of the seal segment relative to the carrier.

In some embodiments, the receiving space may have a predetermined axial length between the first end and the second end of the protrusion. The predetermined axial length may control an amount of compression of the bias member between the insert body and the mount post so that the force load applied by the bias member to the seal segment is within a predetermined force threshold range.

In some embodiments, the first attachment flange of the carrier may be shaped to include a through hole. In some embodiments, the insert body may extend into the through hole to fix the insert body to the first attachment flange.

In some embodiments, the protrusion may extend around an outer perimeter edge of the insert body. The protrusion may form a rim around the insert body. In some embodiments, the protrusion may be spaced apart from the outer perimeter edge of the insert body.

In some embodiments, the mounting insert may further include a shaft. The shaft may extend axially from the insert body through the first attachment flange and the mount post and into the second attachment flange to interlock the seal segment with the carrier.

In some embodiments, the protrusion may include a rigid member and a fugitive member. The rigid member may extend from the insert body toward the mount post. The fugitive member may be located axially between the rigid member and the mount post of the seal segment.

In some embodiments, the mounting insert may further include a rim. The rim may extend around the outer perimeter edge of the insert body.

In some embodiments, the bias member may be arranged around the protrusion. The rim may have an axial rim length that is less than the predetermined axial length so that the rim is spaced apart axially from the mount post.

In some embodiments, the mounting insert may further include a shaft. The shaft may extend axially from the protrusion through the first attachment flange and the mount post and into the second attachment flange to interlock the seal segment with the carrier.

In some embodiments, the second attachment flange may include a radially extending wall and a contact pad. The contact pad may extend axially from the radially extending wall toward the first attachment flange and may engage the mount post of the seal segment.

In some embodiments, the mounting insert may further include a shaft. The shaft may extend from the protrusion through the first attachment flange and the mount post and into the contact pad of the second attachment flange.

According to another aspect of the present disclosure, a turbine assembly adapted for use in a gas turbine engine may include a first component, a second component, and a mounting insert. The mounting insert may include an insert body, a protrusion, and a bias member. The insert body may be fixed to the second component. The protrusion may extend away from the insert body toward the first component to a terminal end. The terminal end of the protrusion may be engaged with the first component to define a receiving space having a predetermined length between the insert body and the terminal end of the protrusion. The bias member may be located in the receiving space and may be engaged with the insert body and the first component. In some embodiments, the mounting insert may be interference fit with the second component.

In some embodiments, the second component may include an outer wall, a first attachment flange, and a second attachment flange. The outer wall may extend circumferentially at least partway about an axis. The first attachment flange may extend radially away from the outer wall. The second attachment flange may extend radially away from the outer wall.

In some embodiments, the second attachment flange may be spaced apart from the first attachment flange to define a channel. The channel may receives the first component.

In some embodiments, the protrusion may be arranged around an outer perimeter edge of the insert body. In some embodiments, the protrusion may be spaced apart from an outer perimeter edge of the insert body.

In some embodiments, the mounting insert may further include a shaft. The shaft may extend from the insert body through the second component and the first component to interlock the first component with the second component.

In some embodiments, the protrusion may include a rigid member and a fugitive member. The rigid member may be coupled with the insert body. The fugitive member may coupled with the rigid member and may be engaged with the first component.

In some embodiments, the mounting insert may further include a rim. The rim may be arranged around the outer perimeter edge of the insert body. In some embodiments, the rim may be spaced apart from the first component.

In some embodiments, the first component may be a turbine vane and the second component may be support structure. The support structure may be configured to support that turbine vane in position relative to the axis. The mounting insert may be coupled with the support structure and may be engaged with the turbine vane.

According to another aspect of the present disclosure, a method may include providing a first component, a second component, and a mounting insert. The mounting insert may include an insert body, a protrusion, and a mounting insert. The insert body may extend into the second component. The protrusion may extend from a first surface of the insert body toward the first component and may terminate at a second surface to define a receiving space therebetween.

In some embodiments, the method further may include locating the bias member in the receiving space and locating the first component in a channel formed in the second component. In some embodiments, the method further includes inserting the mounting insert into the second component so that the protrusion and the bias member engage the first component and fixing the insert body to the second component.

These and other features of the present disclosure will become more apparent from the following description of the illustrative embodiments.

DETAILED DESCRIPTION OF THE DRAWINGS

Figure 1:
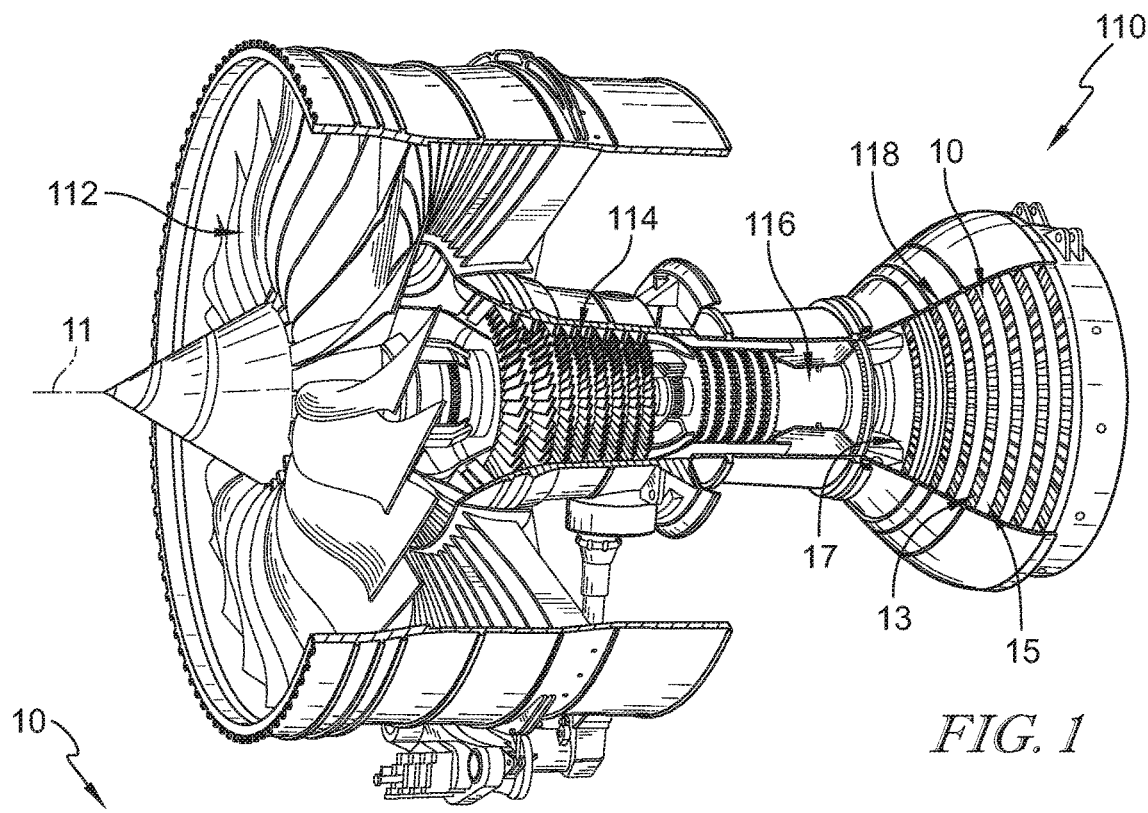
FIG. 1 is a cutaway view of a gas turbine engine that includes a fan, a compressor, a combustor, and a turbine, the turbine includes turbine wheel assemblies that are driven to rotate about an axis of the engine to generate power and turbine vane assemblies that are positioned to direct the gases toward the bladed wheel assemblies.

For the purposes of promoting an understanding of the principles of the disclosure, reference will now be made to a number of illustrative embodiments illustrated in the drawings and specific language will be used to describe the same.

A turbine assembly 10 adapted for use in a gas turbine engine 110, is shown in FIGS. 2-5. The turbine assembly 10 includes a seal segment 12, a carrier 14, and a mounting insert 16 as shown in FIGS. 2-5. The present disclosure provides methods and apparatuses for supporting the seal segment 12 with the carrier 14 using spring or compression forces.

Figure 2:
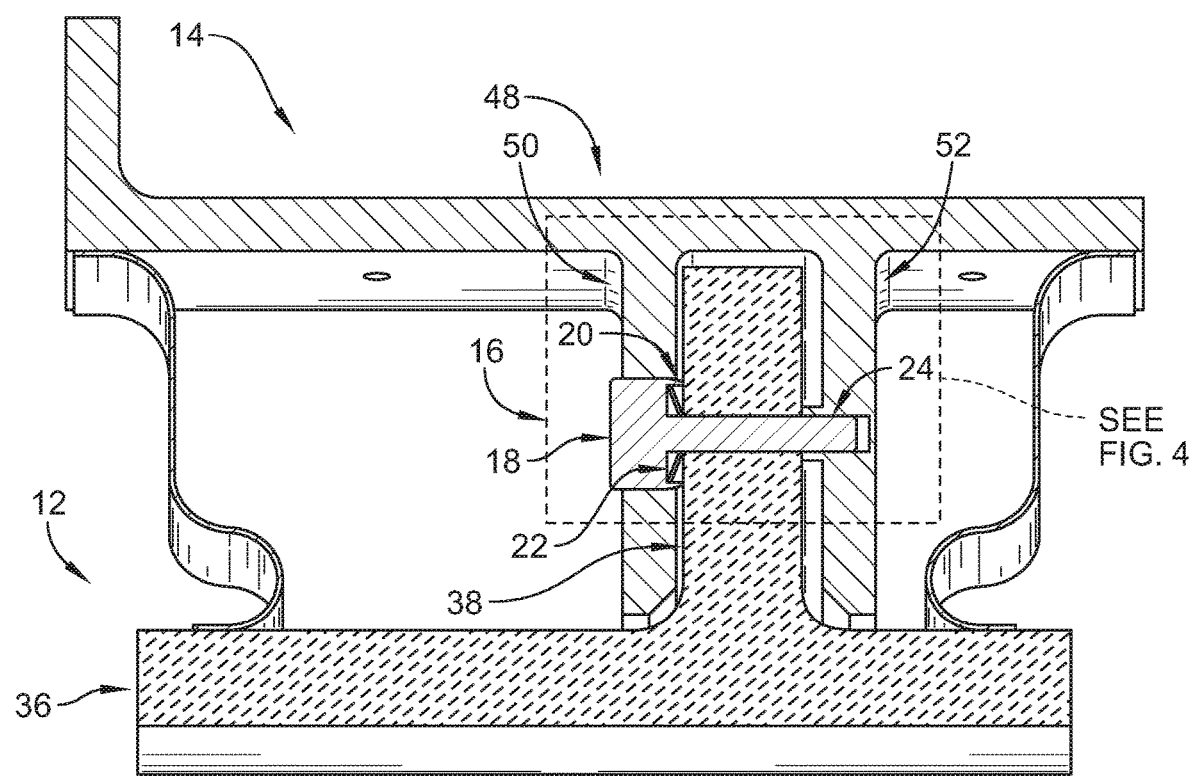
FIG. 2 is a perspective view of a turbine assembly included in the turbine of the engine and adapted to be arranged around one of the turbine wheels, the turbine assembly including a carrier, a seal segment located between a fore attachment flange and an aft attachment flange of the carrier, and a mounting insert that extends axially into the fore attachment flange and engages the seal segment to interlock the seal segment with the carrier.
Figure 4:
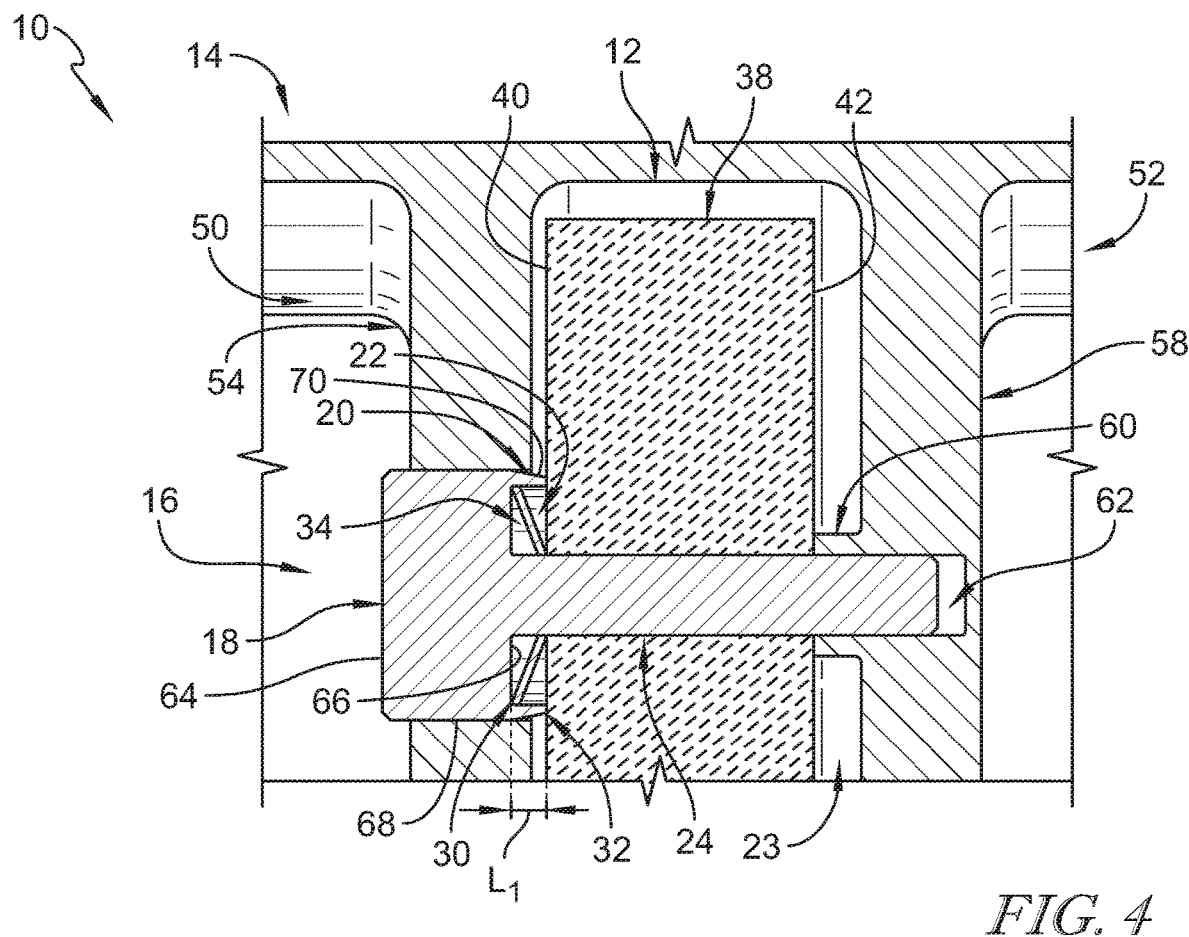
FIG. 4 is a detail view of the turbine assembly of FIG. 2 showing the mounting insert includes an insert body that is fixed to the first attachment flange, a protrusion that extends axially from the insert body and engages the mount post of the seal segment to define a receiving space, and a bias member located in the receiving space and engaged with the insert body and the mount post to apply the force load to the mount post that limits axial movement of the seal segment relative to the carrier, the mounting insert further including a shaft portion that extends through the mount post.

The seal segment 12 extends partway circumferentially about an axis 11 and defines a gas path boundary 17 of the turbine assembly 10 as suggested in FIGS. 2 and 4. The carrier 14 supports the seal segment 12 in position radially relative to the axis 11 and defines a channel 23 that receives a portion of the seal segment 12 therein. The mounting insert 16 is coupled with the carrier 14 and engaged with the seal segment 12 to bias the seal segment 12 into engagement with the carrier 14 with a predetermined force load.

Figure 5:
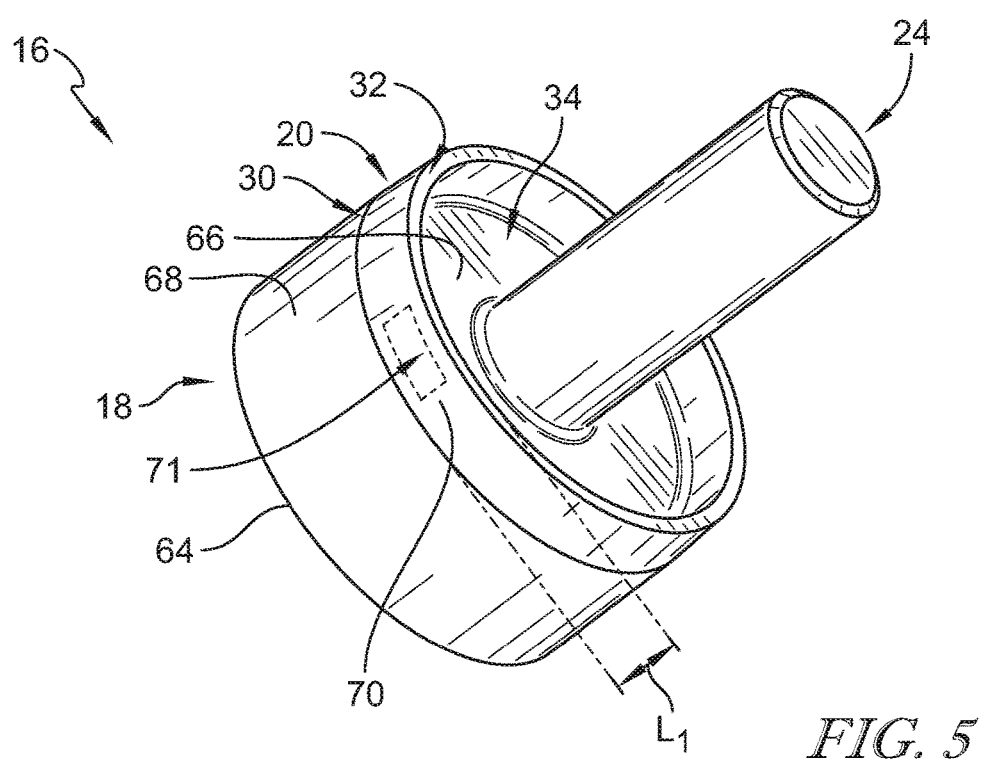
FIG. 5 is a perspective view of the mounting insert included in the turbine assembly of FIG. 2 showing the mounting insert further includes the shaft that extends axially from the insert body, and further showing the protrusion is located at an outer perimeter edge of the insert body to form a rim that extends around the insert body to define the receiving space between the protrusion and the shaft.

The mounting insert 16 includes an insert body 18, a protrusion 20, a bias member 22, and a shaft 24 as shown in FIGS. 2-5. The insert body 18 is fixed to the carrier 14. The protrusion 20 extends axially between a first end 30 coupled with the insert body 18 and a second or a terminal end 32 engaged with the seal segment 12 as shown in FIGS. 4 and 5. The protrusion 20 defines a receiving space 34 between the first end 30 and the second end 32 of the protrusion 20. The bias member 22 is located in the receiving space 34 and engaged with the insert body 18 and the seal segment 12 to apply the predetermined force load to the seal segment 12. The force load is configured to limit axial movement of the seal segment 12 relative to the carrier 14.

Figure 17:
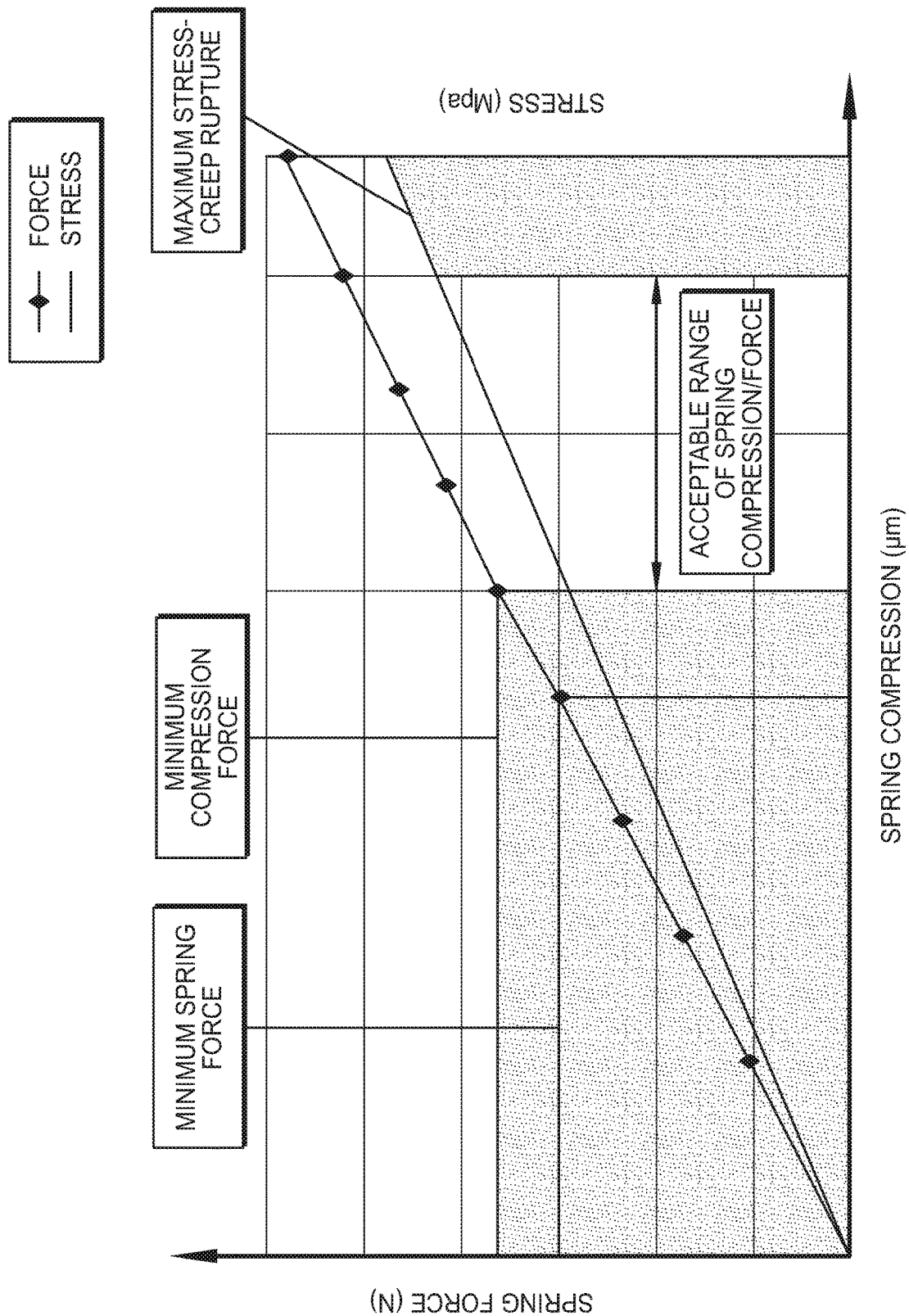
FIG. 17 is a graph of datasets illustrating a predetermined force threshold range for the force load applied by the bias member and suggesting that a value in an acceptable range is achieved by sizing the receiving space in the mounting insert.

The receiving space 34 has a predetermined axial length L1 between the first end 30 and the second end 32 of the protrusion 20 as shown in FIGS. 4 and 5. The predetermined axial length L1 is configured to control an amount of compression of the bias member 22 between the insert body 18 and the seal segment 12 so that the force load applied by the bias member 22 to the seal segment 12 is within a predetermined force threshold range as shown in FIG. 17. Without mounting insert 16, the tolerances between the components and stack ups may make it difficult to achieve a consistent gap for the bias member 22. As such, the force load applied to the bias member 22 could vary and be less than or greater than the acceptable range of spring compression force.

The predetermined force threshold range ensures the bias member 22 applies a minimum compression force to the seal segment 12, but limits compression force of the bias member 22. The minimum compression force prevents movement of the seal segment 12 relative to the carrier 14 in addition to preventing the bias member 22 from cracking under fatigue. The maximum compression force of the bias member 22 is correlated to the maximum allowable stress within the bias member 22 and/or the ceramic matrix composite seal segment 12. The maximum stress is the amount of allowable stress within the bias member 22 before creep rupture and/or damage to the components of turbine assembly 10, such as the ceramic matrix composite seal segment 12.

The turbine assembly 10 is adapted for use in the gas turbine engine 110, which includes a fan 112, a compressor 114, a combustor 116, and a turbine 118 as shown in FIG. 1. The fan 112 is driven by the turbine 118 and provides thrust for propelling an aircraft. The compressor 114 compresses and delivers air to the combustor 116. The combustor 116 mixes fuel with the compressed air received from the compressor 114 and ignites the fuel. The hot, high pressure products of the combustion reaction in the combustor 116 are directed into the turbine 118 to cause the turbine 118 to rotate about the axis 11 of the gas turbine engine 110 and drive the compressor 114 and the fan 112. In other embodiments, the fan 112 may be omitted and the turbine 118 drives a propeller, drive shaft, or other suitable alternative.

The turbine 118 includes a plurality of the static turbine vane rings 13 that are fixed relative to the axis 11 and a plurality of the bladed wheel assemblies 15 as suggested in FIG. 1. Each turbine vane ring 13 includes a plurality of airfoils. The hot gases are conducted through the gas path 17 and interact with the bladed wheel assemblies 15 to cause the bladed wheel assemblies 15 to rotate about the axis 11. The turbine vane rings 13 are positioned to direct the gases toward the bladed wheel assemblies 15 with a desired orientation.

In the illustrative embodiments of FIGS. 2-13, the turbine assemblies 10, 210, 310, 410, 510 are configured to be arranged circumferentially around one of the bladed wheel assemblies 15 to block the gases from passing around outer tips of blades included in one of the bladed wheel assemblies 15. Gases that pass around the outer tips may not rotate the bladed wheel assemblies 15 and the energy of the gases may be lost to heat waste. In the illustrative embodiments of FIGS. 14-16, the turbine assemblies 610, 710 are a portion of the turbine vane ring 13 and configured to direct the hot gases through the gas path 17 toward the bladed wheel assemblies 15.

The seal segment 12 of the illustrative turbine assembly 10 is made entirely of ceramic matrix composite materials and the carrier 14 is made of metallic materials in the illustrative embodiments. The ceramic matrix composite seal segment 12 is adapted to withstand high temperatures, but may have relatively low strength compared to the metallic carrier 14. The carrier 14 provides structural strength to the turbine assembly 10 by receiving the force loads applied to the seal segment 12 and transferring them to a casing that surrounds the turbine assembly 10. The carrier 14 may not be capable of withstanding directly the high temperatures experienced by the seal segment 12. In other embodiments, the seal segment 12, the carrier 14, and the mounting insert 16 may each comprise any suitable materials including ceramics, ceramic matrix composites, metals, alloys, super alloys, etc.

Figure 3:
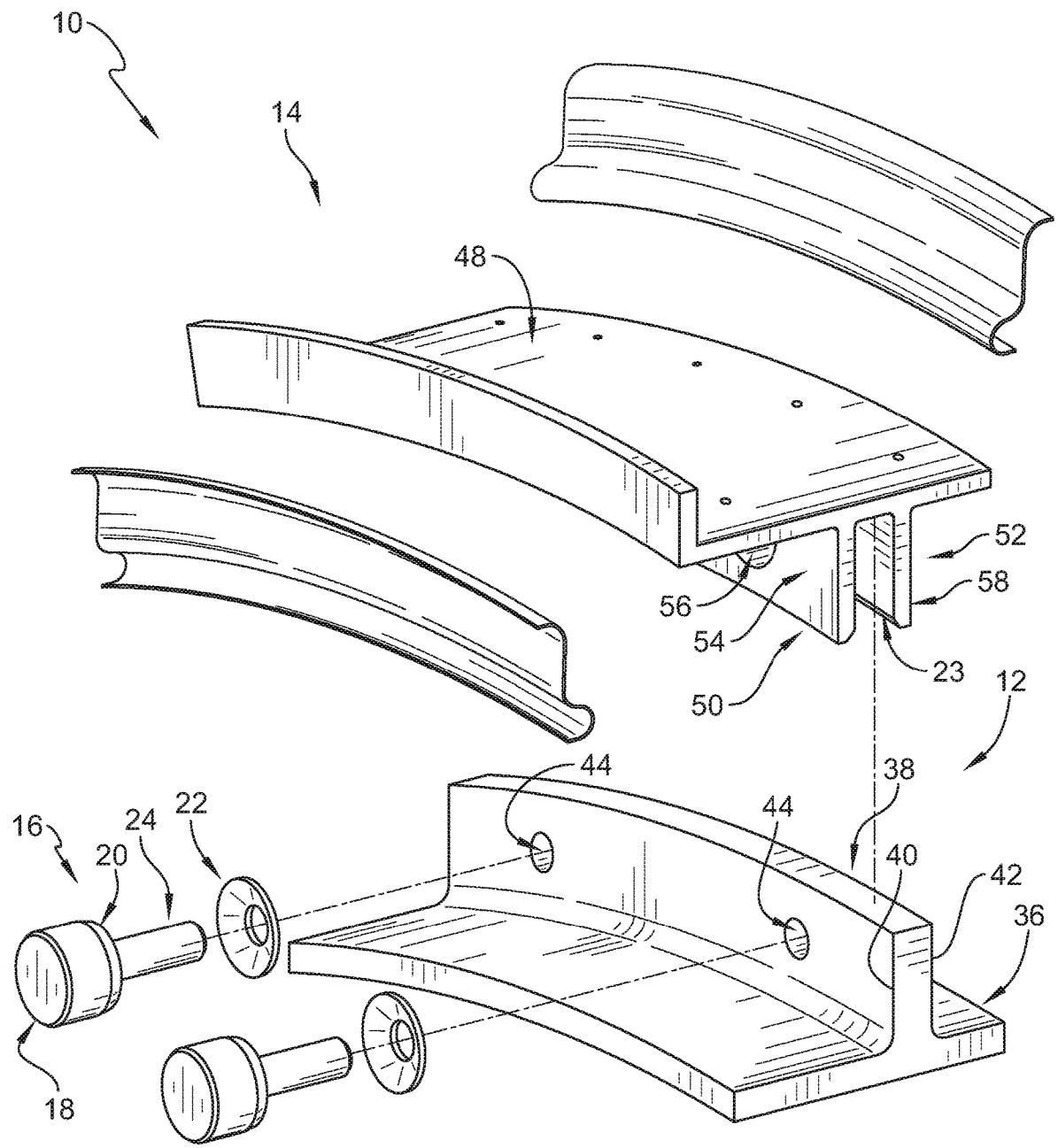
FIG. 3 is an exploded view of the turbine assembly of FIG. 2 showing the seal segment includes a shroud wall that defines a portion of a gas path of the gas turbine engine and a mount post that extends radially outward from the shroud wall toward a radially inwardly opening channel formed between the fore attachment flange and the aft attachment flange of the carrier and suggesting the mounting inserts are adapted to mate with the mount post.

The seal segment 12 includes a shroud wall 36 and a mount post 38 as shown in FIGS. 2-4. The shroud wall 36 extends circumferentially partway around the axis 11 to define a portion of the gas path 17. The mount post 38 extends radially outward away from the shroud wall 36 into the radially inwardly opening channel 23. The seal segment 12 is configured to be engaged with the carrier 14 to couple the seal segment 12 with the carrier 14. The shroud wall 36 and the mount post 38 are integrally formed to provide a single, one-piece component.

The mount post 38 extends substantially radially outward away from the shroud wall 36 as shown in FIGS. 2-4. The mount post 38 is received in the channel 23 and is coupled to the carrier 14 with the mounting insert 16. Illustratively, the seal segment 12 includes a single mount post 38. Such a design may allow for simple and low cost manufacturing of the seal segment 12. The mount post 38 is located axially offset of a midpoint of the shroud wall 36 in the aft direction. The mount post 38 includes a fore face 40 and an aft face 42 as shown in FIGS. 3 and 4. The mount post 38 is formed to include through holes 44 that extend axially through the mount post 38 and are sized to receive the shaft 24 of the mounting insert 16 in the illustrative embodiment. The shaft 24 may help block circumferential and radial movement of the seal segment 12 relative to the carrier 14.

In some embodiments, the mount post 38 may be formed to include machined lands on either the fore face 40 or the aft face 42. The machined lands on the mount post 38 may reduce tolerance stack and enable lower friction between the contact of the seal segment 12 with the carrier 14 and/or the seal segment 12 with the mounting insert 16. In some embodiments, an optional coating may be applied to one of the faces 40, 42 of the mount post 38 at the interface between the protrusion 20 and the mount post 38 to minimize friction, fretting, and/or chemical interaction.

In some embodiments, the shaft 24 may be coated with the optional coating. In other embodiments, the mounting insert 16 may further include a sleeve or collar that surrounds the shaft 24. The sleeve may be made from a non-metallic material configured to minimize chemical interaction between the shaft 24 and the mount post 38.

The carrier 14 includes an outer wall 48, a first attachment flange 50, and a second attachment flange 52 as shown in FIGS. 2-4. The outer wall 48 extends circumferentially at least partway about the axis 11. The first or fore attachment flange 50 extends radially inward from the outer wall 46. The second or aft attachment flange 52 extends radially inward from the outer wall 48 and is spaced apart from the first attachment flange 50 to define the radially inwardly opening channel 23 that receives the mount post 38 of the seal segment 12.

The first attachment flange 50 includes a radially extending wall 54 and through holes 56 as shown in FIGS. 2-4. The radially extending wall 54 extends radially inward from the outer wall 46. The through holes 56 extend axially through the radially extending wall 54.

The second attachment flange 52 includes a radially extending wall 58, a contact pad 60, and a blind hole 62 as shown in FIGS. 2-4. The radially extending wall 58 extends radially inward from the outer wall 46. The contact pad 60 extends axially away from the radially extending wall 58 toward the mount post 38 of the seal segment 12. The contact pad 60 engages the mount post 38 of the seal segment 12 to axially locate the bias member 22 between the insert body 18 and the mount post 38 of the seal segment 12. The blind hole 62 is sized to receive the shaft 24 of the mounting insert 16. In the illustrative embodiment, the blind hole 62 is formed in the contact pad 60 such that the shaft 24 of the mounting insert 16 extends from the insert body 18 axially into the contact pad 60.

In some embodiments, the hole 62 may be a through hole 62 that extends through the radially extending wall 58 of the second attachment flange 52. The shaft 24 may extend through the second attachment flange 52 within the hole 62 and mate with a self-locking nut to axially retain the mounting insert 16 relative to the carrier 14.

In the illustrative embodiment, the insert body 18 of the mounting insert 16 is circular in shape and includes a first surface 64, a second surface 66, and an outer perimeter edge surface 68 as shown in FIG. 5. The second surface 66 is axially spaced apart from the first surface 64 and defines a portion of the receiving space 34 in the illustrative embodiment. The outer perimeter edge surface 68 extends between and interconnects the first surface 64 and the second surface 66 and defines an outer perimeter edge of the insert body 18.

In some embodiments, the insert body 18 may be another suitable shape such as an oval. In other embodiments, the insert body 18 may be rectangular. In some embodiments, the bias member 22 may be one or a wave or cockle spring. The bias member 22 may be rectangular, or another suitable shape to match the shape of the insert body.

In the illustrative embodiment, the insert body 18 of the mounting insert 16 is interference fit with the through hole 56 of the first attachment flange 50. In other embodiments, the outer perimeter edge surface of each insert body 18 may be threaded and mates with threads formed in the corresponding through hole 56. In other embodiments, the insert body 18 may be coupled with the fore attachment flange 50 using another suitable method such as bonding, brazing, etc.

In the illustrative embodiment, the protrusion 20 extends around the outer perimeter edge of the insert body 18 to form a rim 20 as shown in FIG. 5. The rim 20 extends away from the second surface 66 and around the outer perimeter edge of the insert body 18. The rim 20 surrounds the shaft 24 such that the receiving space 34 is between the protrusion 20 and the shaft 24. The bias member 22 extends around the shaft 24 and is surrounded by the rim 20 in the illustrative embodiment.

In the illustrative embodiment, the protrusion 20 extends entirely around the outer perimeter edge of the insert body 18. In other embodiments, the protrusion 20 may be segmented and only extend partway around the outer perimeter edge of the insert body 18.

In the illustrative embodiment, the insert body 18, the protrusion 20, and the shaft 24 are integrally formed to form a single, piece component. The mounting insert 16 may be made by casting or molding. In other embodiments, the insert body 18 and the shaft 24 may be integrally formed and the receiving space 34 may then be machined into the insert body 18 to form the protrusion 20. In some embodiments, the mounting insert 16 may be machined to integrally form the single, piece component.

In other embodiments, the protrusion 20 may be welded to the second surface 66 of the insert body 18 around the outer perimeter edge to form the receiving space 34. In some embodiments, the shaft 24 may be welded to the second surface 66 at a center of the insert body 18 and the receiving space 34 may be machined into the insert body 18 to form the protrusion 20.

In the illustrative embodiment, the protrusion 20 is shaped to include a chamfered surface 70 as shown in FIGS. 4 and 5. The chamfered surface 70 extends from the outer perimeter edge surface 68 of the insert body 18 and extends between the first end 30 and the second end 32 of the protrusion 20. The chamfered surface 70 is configured to aid installation of the mounting insert 16 into the through hole 56 formed in the carrier 14.

In some embodiments, the protrusion 20 may be shaped to include an inspection hole 71 as suggested in FIG. 5. The inspection hole 71 may be sized to allow inspection of the bias member 22 during assembly of the mounting insert 16. In other embodiments, the inspection hole 71 may be formed in the insert body 18. In such embodiments, once the mounting insert 16 is installed, the inspection hole 71 may be filled in to seal the assembly 10.

In some embodiments, the mounting insert 16 may further include a washer. The washer may be located between the bias member 22 and the mount post 38. In some embodiments, the washer may comprise metallic or ceramic materials. In other embodiments, the washer may be made from a material with a different coefficient of thermal expansion than the metallic materials of the carrier 14 and mounting insert 16 and the ceramic material of the seal segment 12. The washer may be coupled to one of the bias member 22 and the mount post 38 for thickness control.

A method of assembling the turbine assembly 10 may include several steps. The method includes forming the mounting insert 16, locating the mount post 38 in the channel 23 formed in the carrier 14, inserting the mounting insert 16 into the through hole 56 of the fore attachment flange 50 so that the protrusion 20 and the bias member 22 engage the mount post 38 of the seal segment 12, and fixing the insert body 18 to the fore attachment flange 50.

The mounting insert 16 may be formed using one or several different manufacturing processes. In some embodiments, the insert body 18 and shaft 24 may be cast and the protrusion 20 may be formed by machining the receiving space 34 into the insert body 18. In other embodiments, the insert body 18, protrusion 20, and the shaft 24 may be cast to form an integral, one piece component.

In some embodiments, the mounting insert 16 may be formed by machining the shaft 24 and the receiving space 34 to form the protrusion 20. In other embodiments, the forming step may include welding the protrusion 20 and the shaft 24 to the second surface 66 of the insert body 18 to form the receiving space 34 therebetween.

In the illustrative embodiment, the method further includes applying the predetermined force load to the mount post 38 of the seal segment 12. To ensure the bias member 22 applies the predetermined force load to the seal segment 12, the method further includes forming the receiving space 34 of the mounting insert 16 to have the predetermined axial length L1 between the first end 30 and the second end 32 of the protrusion 20. The predetermined axial length L1 is selected so as to control an amount of compression of the bias member 22 so that the predetermined force load applied by the bias member 22 is within the predetermined force threshold range. Once the receiving space 34 is formed, the method includes locating the bias member 22 in the receiving space 34.

In the illustrative embodiment, the method further includes inserting the shaft 24 of the mounting insert 16 through the through hole 44 formed in the mount post 38 and into the blind hole 62 formed in the carrier 14. The shaft 24 is inserted into the carrier 14 to block radial and circumferential movement of the seal segment 12 relative to the carrier 14.

In the illustrative embodiment, the mounting insert 16 is fixed to the fore attachment flange 50 by interference fitting the insert body 18 in the through hole 56 formed in the fore attachment flange 50. In other embodiments, the method includes forming threads in the through hole 56 and mating threads on the outer perimeter edge surface 68 of the insert body 18. The mounting insert 16 is then fixed to the carrier 14 by mating the threads of the insert body 18 with the threads in the through hole 56. In some embodiments, the insert body 18 may be welded to the fore attachment flange 50. In other embodiments, the mounting insert 16 may be fixed to the carrier 14 using another suitable method.

In some embodiments, the predetermined force threshold may be between about 5 Newtons and about 500 Newtons. In some embodiments, the predetermined force threshold may be between about 15 Newtons and about 30 Newtons. In other embodiments, the predetermined force threshold may be between about 20 Newtons and about 25 Newtons.

In the illustrative embodiment, the predetermined force threshold is about 17 Newtons and about 26 Newtons.

The predetermined force threshold range drives the predetermined axial length L1 of the receiving space 34 as shown in FIG. 17. As such, the predetermined axial length L1 may be between about 30 micrometers to about 10000 micrometers. In some embodiments, the predetermined axial length L1 may be between about 30 micrometers and about 45 micrometers. In some embodiments, the predetermined axial length L1 may be between about 35 micrometers and 40 micrometers. In other embodiments, the predetermined axial length L1 may be about 38 micrometers. The predetermined axial length L1 may vary depending on the type of bias member 22 implemented in the turbine assembly 10.

In the illustrative embodiment, the predetermined force threshold and predetermined axial length L1 as shown in FIG. 17 relates to a given set of components with coefficients of thermal expansions at a given operating temperature. However, the ranges shown in FIG. 17 may need to be satisfied from build up to peak operating temperatures. The constraint is a surface rather than a discrete point and creep may be considered as the integral of that surface with respect to time spent at each condition through the flight cycle in addition to build/engine-off cumulative time.

Figure 6:
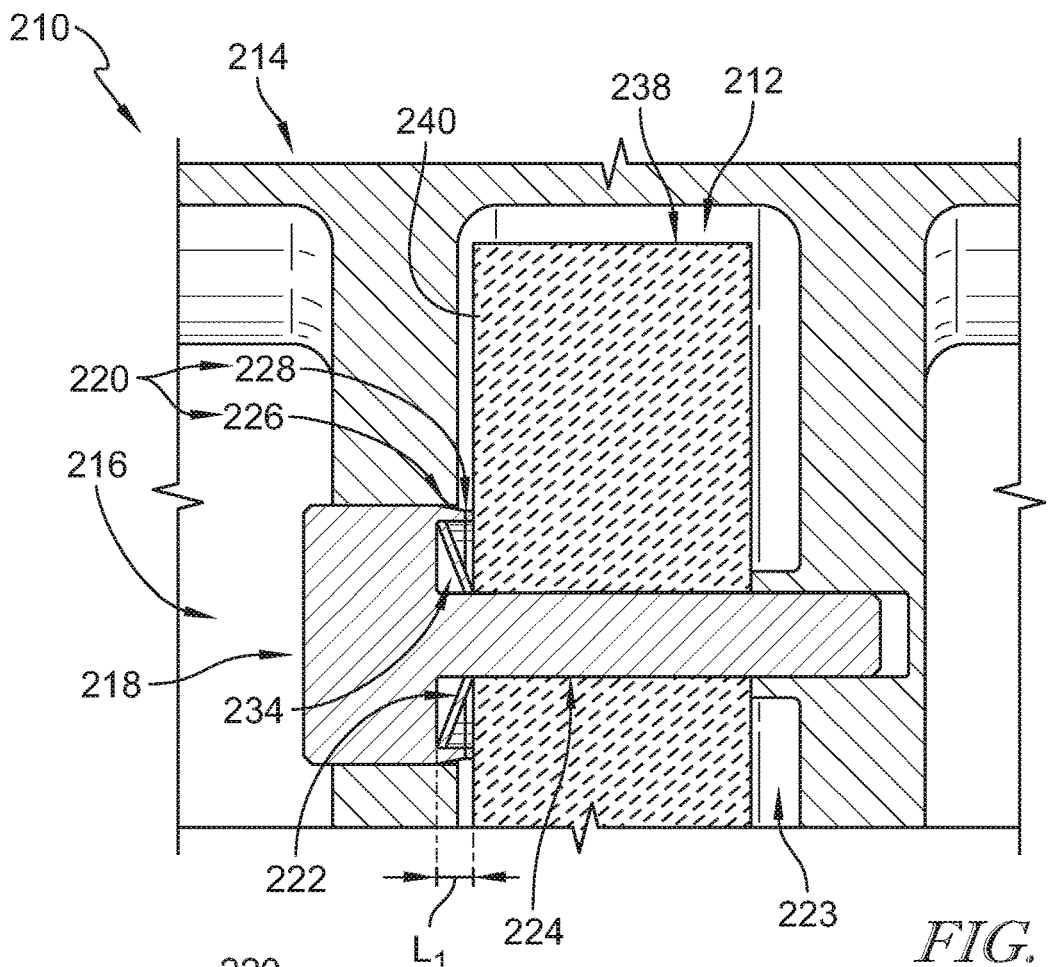
FIG. 6 is a detail view of another turbine assembly adapted for use with the gas turbine engine of FIG. 1 showing the turbine assembly includes a carrier, a seal segment located in a channel formed in the carrier, and a mounting similar to the mounting insert of FIG. 5, but including a fugitive member engaged with the mount post.
Figure 7:
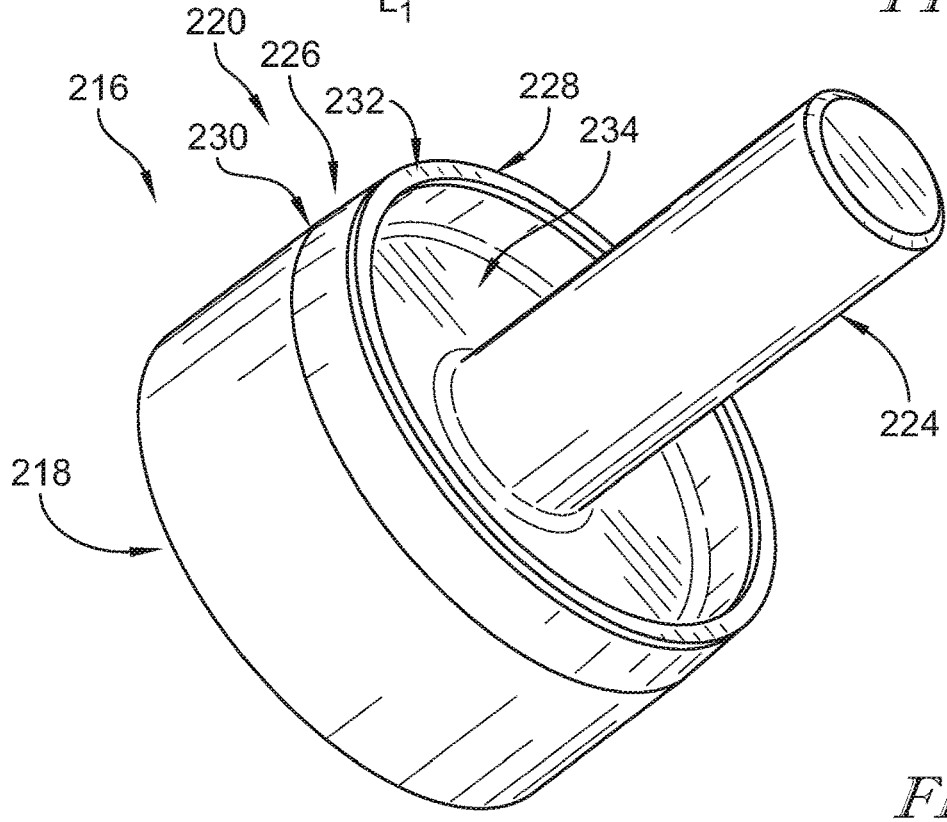
FIG. 7 is a perspective view of the mounting insert included in the turbine assembly of FIG. 6 showing the protrusion includes a rigid member that extends away from the insert body and a fugitive member that is configured to be located axially between the rigid member and the mount post of the seal segment.

Another embodiment of a turbine assembly 210 in accordance with the present disclosure is shown in FIGS. 6 and 7. The turbine assembly 210 is substantially similar to the turbine assembly 10 shown in FIGS. 1-5 and described herein. Accordingly, similar reference numbers in the 200 series indicate features that are common between the turbine assembly 10 and the turbine assembly 210. The description of the turbine assembly 10 is incorporated by reference to apply to the turbine assembly 210, except in instances when it conflicts with the specific description and the drawings of the turbine assembly 210.

The turbine assembly 210 includes a seal segment 212, a carrier 214, and a mounting insert 216 as shown in FIGS. 6 and 7. The seal segment 212 defines a portion of the gas path boundary of the turbine assembly 210. The carrier 214 supports the seal segment 212 in position radially relative to the axis 11 and defines a channel 223 that receives a mount post 238 of the seal segment 212 therein. The mounting insert 216 is coupled with the carrier 214 and engaged with the seal segment 212 to bias the seal segment 212 into engagement with the carrier 214 with a predetermined force load.

The mounting insert 216 is similar to mounting insert 16 and further includes a fugitive member 228. The mounting insert 216 includes an insert body 218, a protrusion 220, a bias member 222, and a shaft 224 as shown in FIGS. 6 and 7. The insert body 218 is fixed to the carrier 14. The protrusion 220 extends axially between a first end 230 coupled with the insert body 218 and a second end 232. The protrusion 220 defines a receiving space 234 between the first end 230 and the second end 232 of the protrusion 220. The bias member 222 is located in the receiving space 234 and engaged with the insert body 218 and the seal segment 212 to apply the force load to the seal segment 212. The shaft 224 extends axially away from the insert body 218 through the mount post 238 of the seal segment 212.

The protrusion 220 includes a rigid member 226 and the fugitive member 228 as shown in FIGS. 6 and 7. The rigid member 226 extends from the insert body 218 toward the mount post 38. The fugitive member 228 is located axially between the rigid member 226 and the mount post 238 of the seal segment 12. In the illustrative embodiment, the fugitive member 228 is arranged between the second end 232 of the protrusion 220 and a fore face 240 of the mount post 238 of the seal segment 212. In other embodiments, the fugitive member 228 may be the washer positioned between the bias member 22 and the mount post 38 to act as an interface therebetween.

The fugitive member 228 is configured to be burned out post installation of the mounting insert 216. Upon installation, the fugitive member 228 may help relieve stresses in the mount post 238 of the seal segment 312 at sub-zero conditions such as cold soak conditions, and prevent the lock-up of the seal segment 12 at ambient conditions.

In the illustrative embodiment, the protrusion 220 is a rim 220 located at an outer perimeter edge of the insert body 218 as shown in FIG. 7. The rim 220 extends away from the insert body 218 and around the outer perimeter edge of the insert body 218. The rim 220 surrounds the shaft 224 such that the receiving space 234 is between the protrusion 220 and the shaft 224. The bias member 222 extends around the shaft 224 and is surrounded by the rim 220 in the illustrative embodiment.

In the illustrative embodiment, the protrusion 220 extends entirely around the outer perimeter edge of the insert body 218. In other embodiments, the protrusion 220 may be segmented an only extend partway around the outer perimeter edge of the insert body 218. In some embodiments, the rigid member 226 extends entirely around the outer perimeter edge of the insert body 218, while the fugitive member 228 is segmented.

In the illustrative embodiment, the insert body 218, the rigid member 226, and the shaft 224 are integrally formed to form a single, piece component, and the fugitive member 228 is fixed with the rigid member 226. In other embodiments, the rigid member 226 of the protrusion 220 may be welded to the second surface 66 of the insert body 18 around the outer perimeter edge. In some embodiments, the shaft 24 may be welded to the second surface 66 at a center of the insert body 18.

A method of assembling the turbine assembly 210 may include several steps. The method includes forming the mounting insert 216, locating the mount post 238 in the channel 223 formed in the carrier 214, inserting the mounting insert 216 into the carrier 214 so that the protrusion 220 and the bias member 222 engage the mount post 238 of the seal segment 212, and fixing the insert body 218 to the carrier 214.

The mounting insert 216 may be formed by first casting, machining, or welding the insert body 218, the shaft 224, and the rigid member 226. Once the insert body 218, the shaft 224, and the rigid member 226 are formed, the fugitive member 228 may be fixed to the rigid member 226. Once the receiving space 234 is formed, the method includes locating the bias member 222 in the receiving space 234.

In the illustrative embodiment, the method further includes inserting the pin 272 through the seal segment 212 and into the carrier 214 and fixing the pin 272 to the carrier 214 to block removal of the pin 272. The pin 272 is inserted into the carrier 214 to block radial and circumferential movement of the seal segment 212 relative to the carrier 214.

Figure 8:
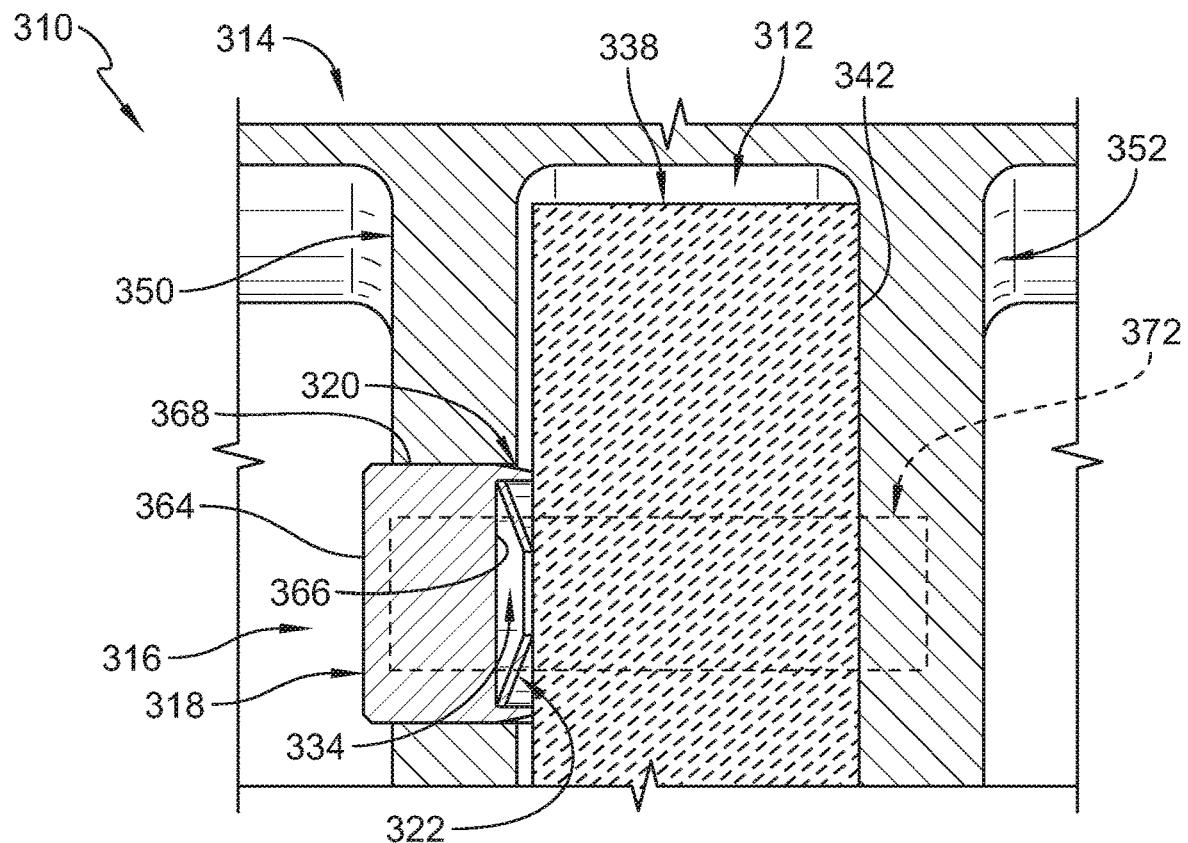
FIG. 8 is a detail view of another turbine assembly adapted for use with the gas turbine engine of FIG. 1 showing the turbine assembly includes a carrier, a seal segment located in a channel formed in the carrier, and a mounting insert that includes an insert body, protrusion, and a bias member, but does not include a shaft portion and suggesting in dotted lines that a separate pin or shaft could be circumferentially offset from the mounting insert.
Figure 9:
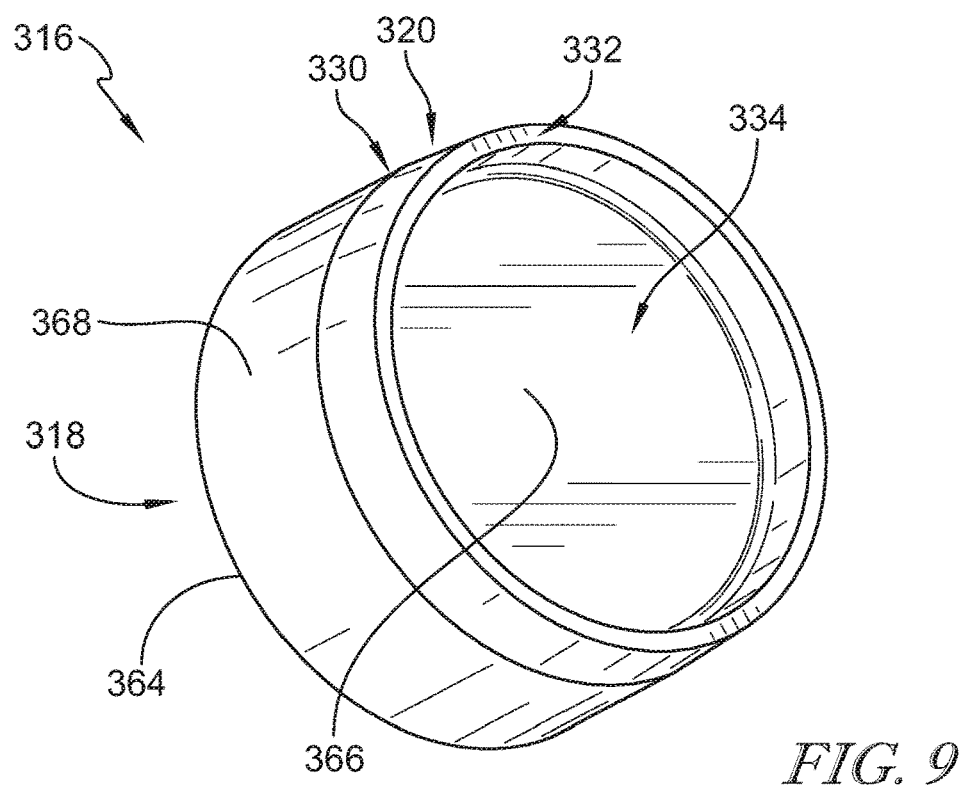
FIG. 9 is a perspective view of the mounting insert included in the turbine assembly of FIG. 8 showing the protrusion extends axially from an outer perimeter edge of the insert body to form a rim that extends around the insert body to define the receiving space and that the mounting insert does not include a shaft portion.

Another embodiment of a turbine assembly 310 in accordance with the present disclosure is shown in FIGS. 8 and 9. The turbine assembly 310 is substantially similar to the turbine assembly 10 shown in FIGS. 1-5 and described herein. Accordingly, similar reference numbers in the 300 series indicate features that are common between the turbine assembly 10 and the turbine assembly 310. The description of the turbine assembly 10 is incorporated by reference to apply to the turbine assembly 310, except in instances when it conflicts with the specific description and the drawings of the turbine assembly 310.

The turbine assembly 310 includes a seal segment 312, a carrier 314, and a mounting insert 316 as shown in FIGS. 8 and 9. The seal segment 312 extends partway circumferentially about the axis 11 and defines the gas path boundary 17 of the turbine assembly 310. The carrier 314 supports the seal segment 312 in position radially relative to the axis 11 and defines a channel 323 that receives a portion of the seal segment 312 therein. The mounting insert 316 is coupled with the carrier 314 and engaged with the seal segment 312 to bias the seal segment 312 into engagement with the carrier 314 with a predetermined force load.

The mounting insert 316 is similar to the mounting insert 16 but does not include a shaft portion. Instead, a separate shaft or pin 372 may optionally be used to interlock the carrier 314 and the seal segment 312. The mounting insert 316 includes an insert body 318, a protrusion 320, and a bias member 322 as shown in FIGS. 8 and 9. The insert body 318 is fixed to the carrier 14. The protrusion 320 extends axially between a first end 330 coupled with the insert body 318 and a second end 332 engaged with the seal segment 312. The protrusion 320 defines a receiving space 334 between the first end 330 and the second end 332 of the protrusion 320. The bias member 322 is located in the receiving space 334 and engaged with the insert body 318 and the seal segment 312 to apply the force load to the seal segment 312.

In the illustrative embodiment, the insert body 318 of the mounting insert 316 includes a first surface 364, a second surface 366, and an outer perimeter edge surface 368 as shown in FIGS. 8 and 9. The second surface 366 is axially spaced apart from the first surface 364. The outer perimeter edge surface 68 extends between and interconnects the first surface 364 and the second surface 366 and defines an outer perimeter edge of the insert body 318. The second surface 366 defines a portion of the receiving space 334 in the illustrative embodiment.

In the illustrative embodiment, the bias member 322 is the only component in the receiving space 334 as shown in FIGS. 8 and 9. As such, the turbine assembly 310 may further include a pin 372 as suggested in FIG. 8. The pin 372 extends axially through a first attachment flange 350 of the carrier 314 and the mount post 338 of the seal segment 312 into a second attachment flange 352 of the carrier 314. The pin 372 is configured to block radial and circumferential movement of the seal segment 312 relative to the carrier 314, while the mounting insert 316 axially interlocks the seal segment 312 with the carrier 314 by applying the force load to the mount post 338.

Figure 10:
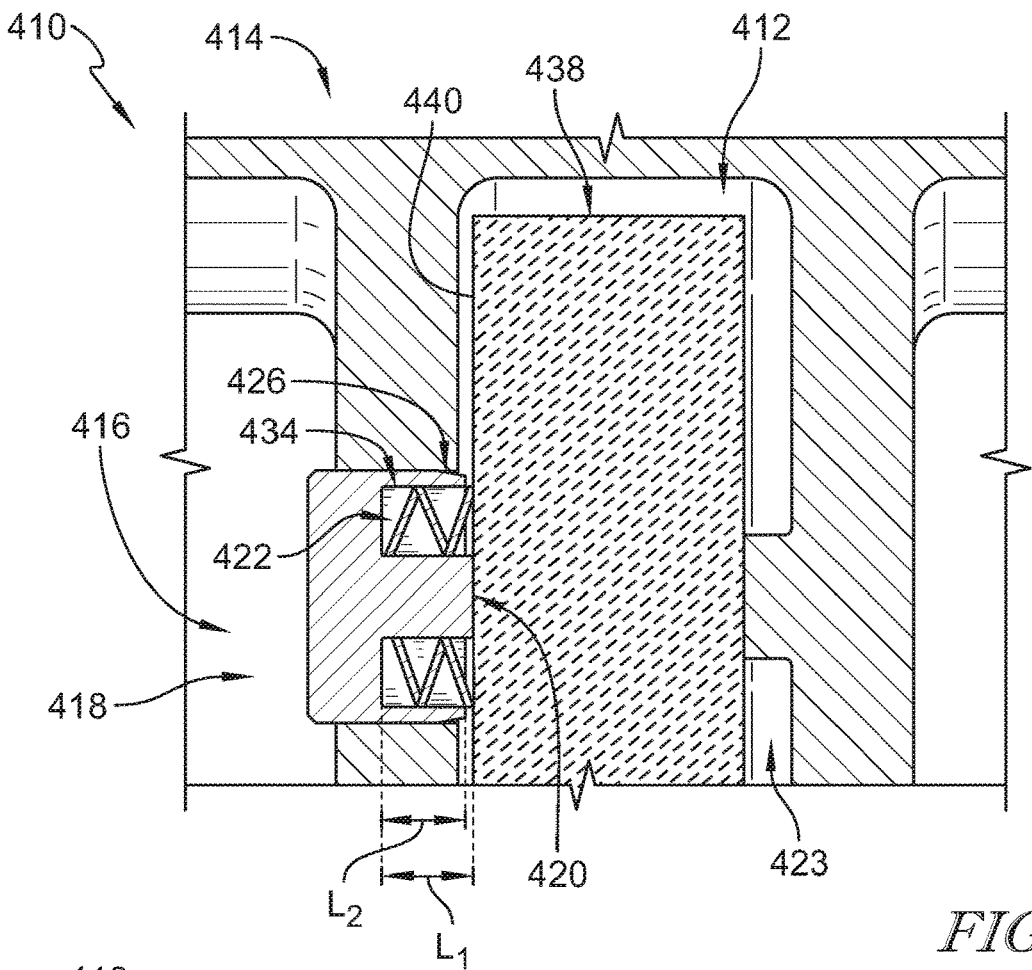
FIG. 10 is a detail view of another turbine assembly adapted for use with the gas turbine engine of FIG. 1 showing the turbine assembly includes a carrier, a seal segment located in a channel formed in the carrier, and a mounting insert that includes an insert body fixed with the carrier, a protrusion located at a center of the insert body that extends axially away from the insert body, and a bias member that extends around the protrusion and engages the seal segment to apply the force load to the seal segment.
Figure 11:
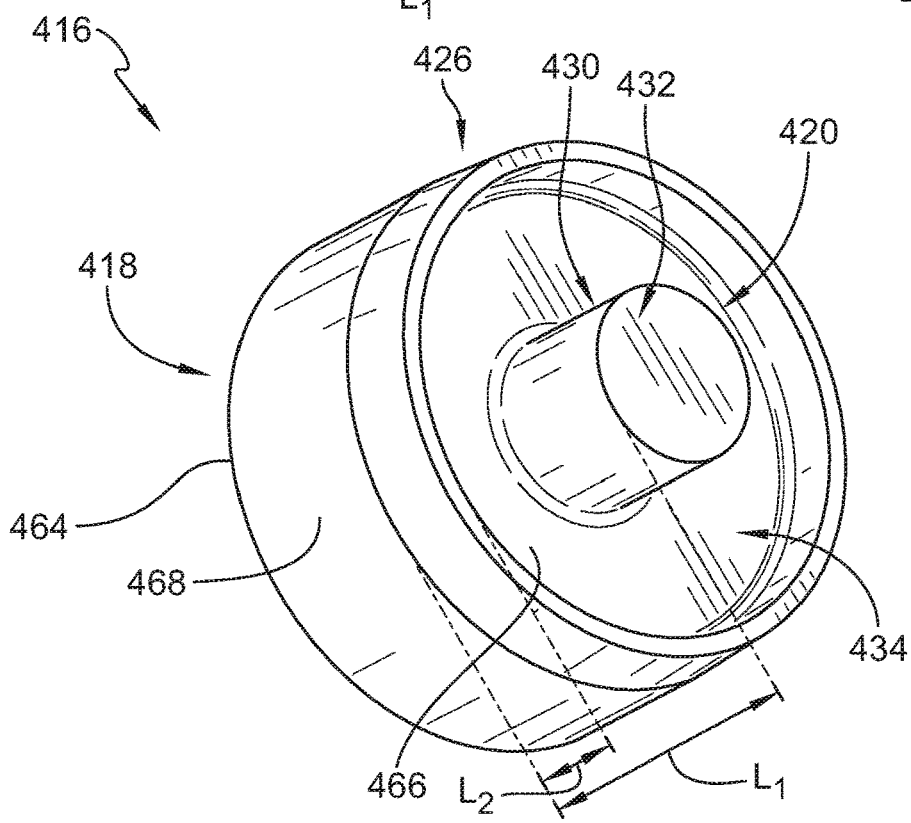
FIG. 11 is a perspective view of the mounting insert including in the turbine assembly of FIG. 10 showing the mounting insert further includes a rim that extends axially from an outer diameter edge of the insert body to form a receiving space between the protrusion and the rim that receives the bias member.

Another embodiment of a turbine assembly 410 in accordance with the present disclosure is shown in FIGS. 10 and 11. The turbine assembly 410 is substantially similar to the turbine assembly 10 shown in FIGS. 1-5 and described herein. Accordingly, similar reference numbers in the 400 series indicate features that are common between the turbine assembly 10 and the turbine assembly 410. The description of the turbine assembly 10 is incorporated by reference to apply to the turbine assembly 410, except in instances when it conflicts with the specific description and the drawings of the turbine assembly 410.

The turbine assembly 410 includes a seal segment 412, a carrier 414, and a mounting insert 416 as shown in FIGS. 10 and 11. The seal segment 412 extends partway circumferentially about the axis 11 and defines the gas path boundary 17 of the turbine assembly 410. The carrier 414 supports the seal segment 412 in position radially relative to the axis 11 and defines the channel 43 that receives a portion of the seal segment 412 therein. The mounting insert 416 is coupled with the carrier 414 and engaged with the seal segment 412 to bias the seal segment 412 into engagement with the carrier 414 with a predetermined force load.

The mounting insert 416 includes an insert body 418, a protrusion 420, a bias member 422, and a rim 426 as shown in FIGS. 10 and 11. The insert body 418 is fixed to the carrier 414. The protrusion 420 extends axially between a first end 430 coupled with the insert body 418 and a second end 432 engaged with the seal segment 412. The rim 426 extends axially from the insert body 418 and is spaced apart from the protrusion 420 to define a receiving space 434 therebetween. The bias member 422 extends around the protrusion 420 and is located in the receiving space 434. The bias member 422 is engaged with the insert body 418 and the seal segment 412 to apply the force load to the seal segment 412 in the illustrative embodiment.

In the illustrative embodiment, the insert body 418 of the mounting insert 416 includes a first surface 464, a second surface 466, and an outer perimeter edge surface 468 as shown in FIGS. 10 and 11. The second surface 466 is axially spaced apart from the first surface 464 and defines a portion of the receiving space 434. The outer perimeter edge surface 468 extends between and interconnects the first surface 464 and the second surface 466 and defines an outer perimeter edge of the insert body 418. In the illustrative embodiment, the rim 426 extends around the outer perimeter edge of the insert body 418 as shown in FIG. 11.

The receiving space 434 has a predetermined axial length L1 between the first end 430 and the second end 432 of the protrusion 420 as shown in FIGS. 10 and 11. The predetermined axial length L1 is configured to control an amount of compression of the bias member 422 between the insert body 418 and the seal segment 412 so that the force load applied by the bias member 422 to the seal segment 412 is within a predetermined force threshold range.

The rim 426 has an axial rim length L2 as shown in FIGS. 10 and 11. The axial rim length L2 is less than the predetermined axial length L1 so that the rim 426 is spaced apart axially from the mount post 438 when the second end 432 of the protrusion 420 engages the fore surface 440 of the mount post 438. In the illustrative embodiment, the rim 426 is configured to retain the bias member 422 in the receiving space 434. The rim 426 controls the external perimeter of the bias member 422 to prevent the bias member 422 from releasing the force load upon thermal expansion of the bias member 422.

A method of assembling the turbine assembly 410 may include several steps. The method includes forming the mounting insert 416, locating the mount post 438 in the channel 423 formed in the carrier 414, inserting the mounting insert 416 into the carrier 414 so that the protrusion 420 and the bias member 422 engage the mount post 438 of the seal segment 412, and fixing the insert body 418 to the carrier 414.

The mounting insert 416 may be formed by first casting or machining to form the insert body 418, the protrusion 420, and the rim 426. In some embodiments, the receiving space 434 is machined into the insert body 418 to form the protrusion 420 and the rim 426. Once the receiving space 434 is formed, the method includes locating the bias member 422 in the receiving space 434.

Figure 12:
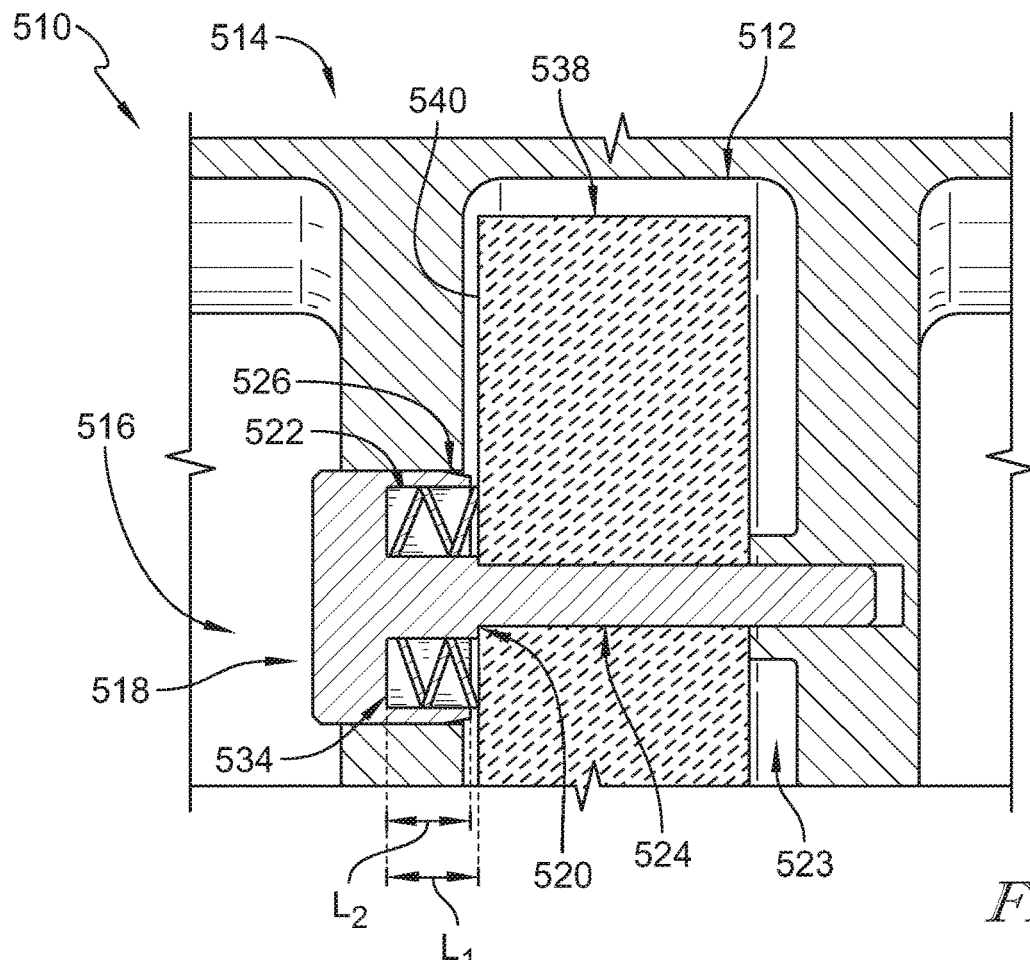
FIG. 12 is a detail view of another turbine assembly adapted for use with the gas turbine engine of FIG. 1 showing the turbine assembly includes a carrier, a seal segment located in a channel formed in the carrier, and a mounting insert similar to the one of FIG. 11, but further including a shaft that extends axially away from the protrusion.
Figure 13:
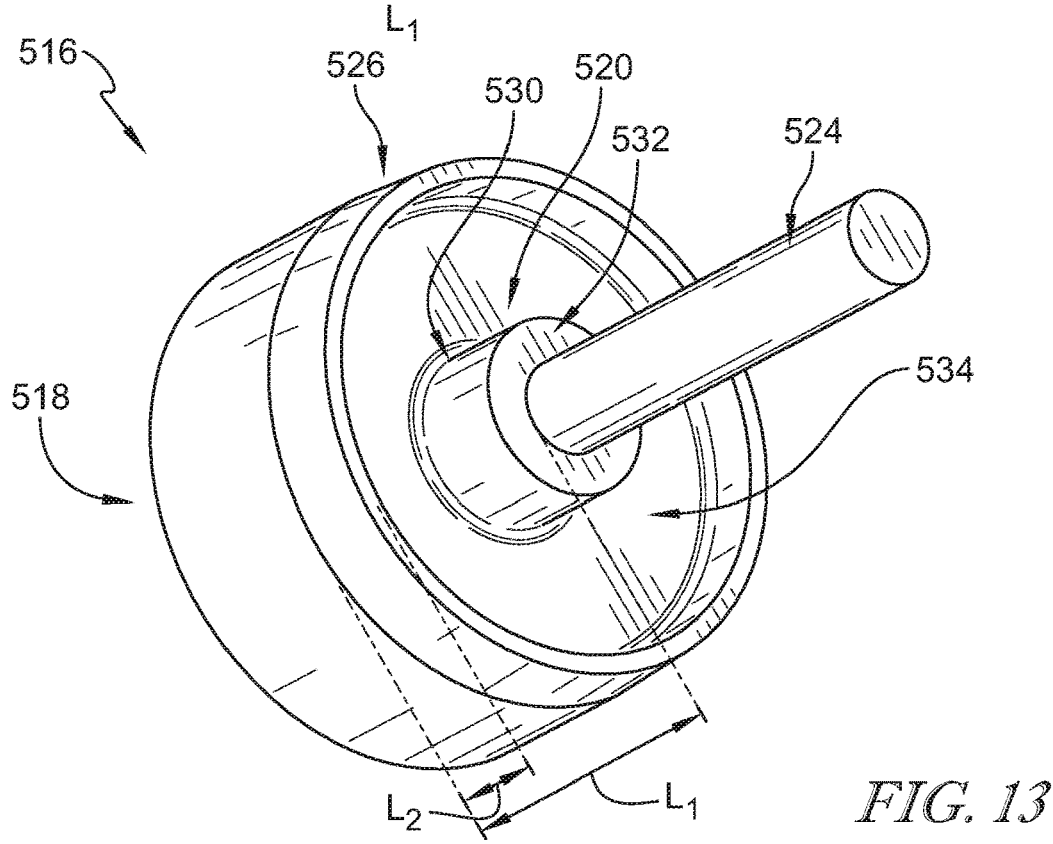
FIG. 13 is a perspective view of the mounting insert including in the turbine assembly of FIG. 12 showing the mounting insert includes a rim that extends axially from an outer diameter edge of the insert body to form a receiving space between the protrusion and the rim that receives the bias member and the shaft that extends axially from the protrusion.

Another embodiment of a turbine assembly 510 in accordance with the present disclosure is shown in FIGS. 12 and 13. The turbine assembly 510 is substantially similar to the turbine assembly 10 shown in FIGS. 1-5 and described herein. Accordingly, similar reference numbers in the 500 series indicate features that are common between the turbine assembly 10 and the turbine assembly 510. The description of the turbine assembly 10 is incorporated by reference to apply to the turbine assembly 510, except in instances when it conflicts with the specific description and the drawings of the turbine assembly 510.

The turbine assembly 510 includes a seal segment 512, a carrier 514, and a mounting insert 516 as shown in FIGS. 12 and 13. The seal segment 512 extends partway circumferentially about the axis 11 and defines the gas path boundary 17 of the turbine assembly 510. The carrier 514 supports the seal segment 512 in position radially relative to the axis 11 and defines the channel 53 that receives a portion of the seal segment 512 therein. The mounting insert 516 is coupled with the carrier 514 and engaged with the seal segment 512 to bias the seal segment 512 into engagement with the carrier 514 with a predetermined force load.

The mounting insert 516 is similar to the mounting insert 416 and further includes a shaft 524 extending from a protrusion 520. The mounting insert 516 includes an insert body 518, the protrusion 520, a bias member 522, the shaft 524, and a rim 526 as shown in FIGS. 12 and 13. The insert body 518 is fixed to the carrier 514. The protrusion 520 extends axially between a first end 530 coupled with the insert body 518 and a second end 532 engaged with the seal segment 512. The rim 526 extends axially from the insert body 518 and is spaced apart from the protrusion 520 to define a receiving space 534 therebetween. The bias member 522 extends around the protrusion 520 in the receiving space 534 and is engaged with the insert body 518 and the seal segment 512 to apply the force load to the seal segment 512 in the illustrative embodiment. The shaft 524 extends axially through the carrier 514 and the seal segment 512 to block radial and circumferential movement of the seal segment 512 relative to the carrier 514.

The receiving space 534 has a predetermined axial length L1 between the first end 530 and the second end 532 of the protrusion 520 as shown in FIGS. 12 and 13. The predetermined axial length L1 is configured to control an amount of compression of the bias member 522 between the insert body 518 and the seal segment 512 so that the force load applied by the bias member 522 to the seal segment 512 is within a predetermined force threshold range.

The rim 526 has an axial rim length L2 as shown in FIGS. 12 and 13. The axial rim length L2 is less than the predetermined axial length L1 so that the rim 526 is spaced apart axially from the mount post 538 when the second end 532 of the protrusion 520 engages the fore surface 540 of the mount post 538. In the illustrative embodiment, the rim 526 is configured to retain the bias member 522 in the receiving space 534.

Figure 14:
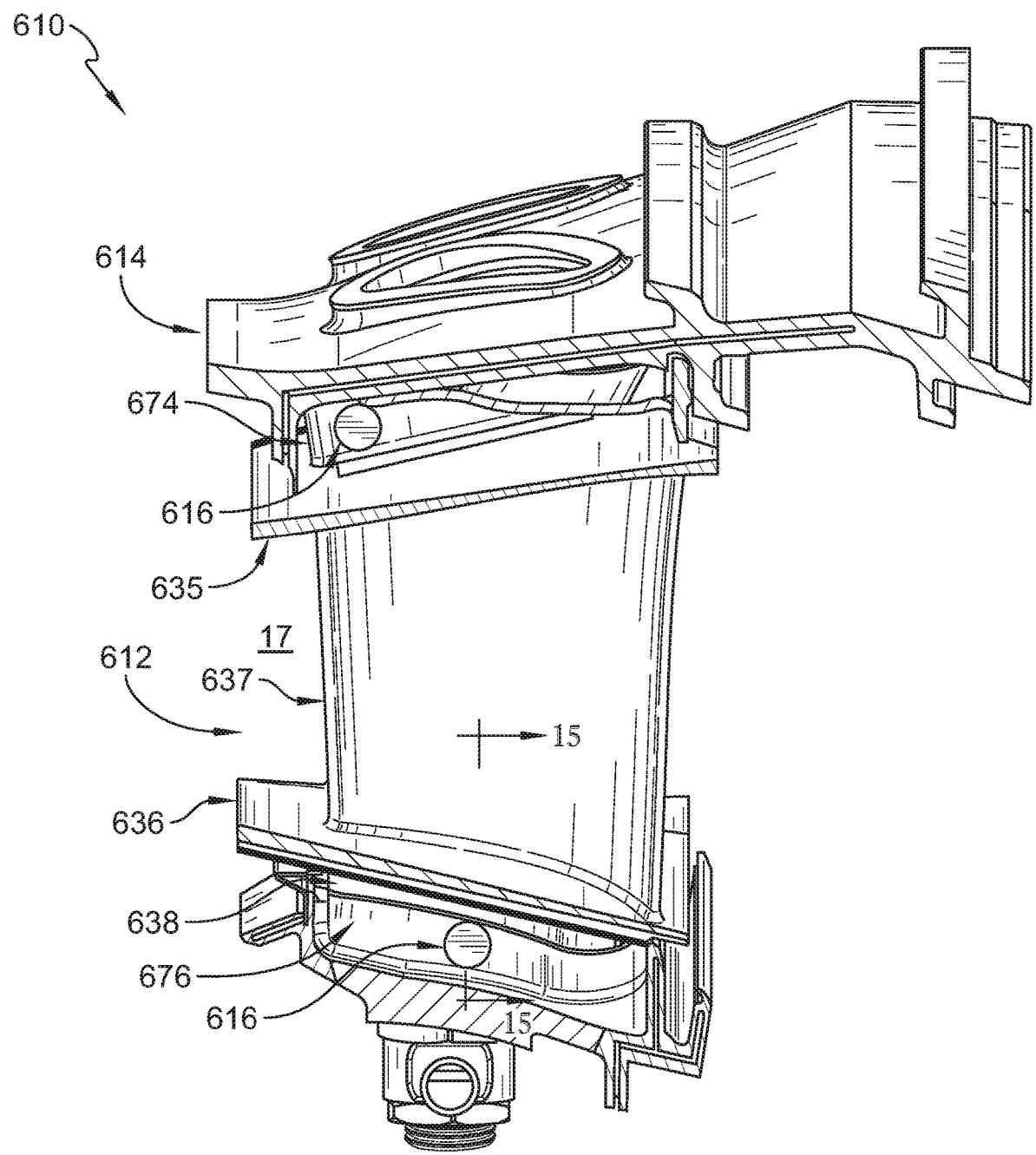
FIG. 14 is a perspective view of another turbine assembly included in the turbine of the engine and adapted to direct the gases toward the rotating wheel assemblies, the turbine assembly including a turbine vane, a support structure that extends radially through the turbine vane to receive aerodynamic loads applied to the turbine vane, and mounting inserts of any FIG. 5, 7, 9, 11, or 13 that are configured to extend through a portion of the turbine vane and engage the support structure to transmits loads from the turbine vane to the support structure.
Figure 15:
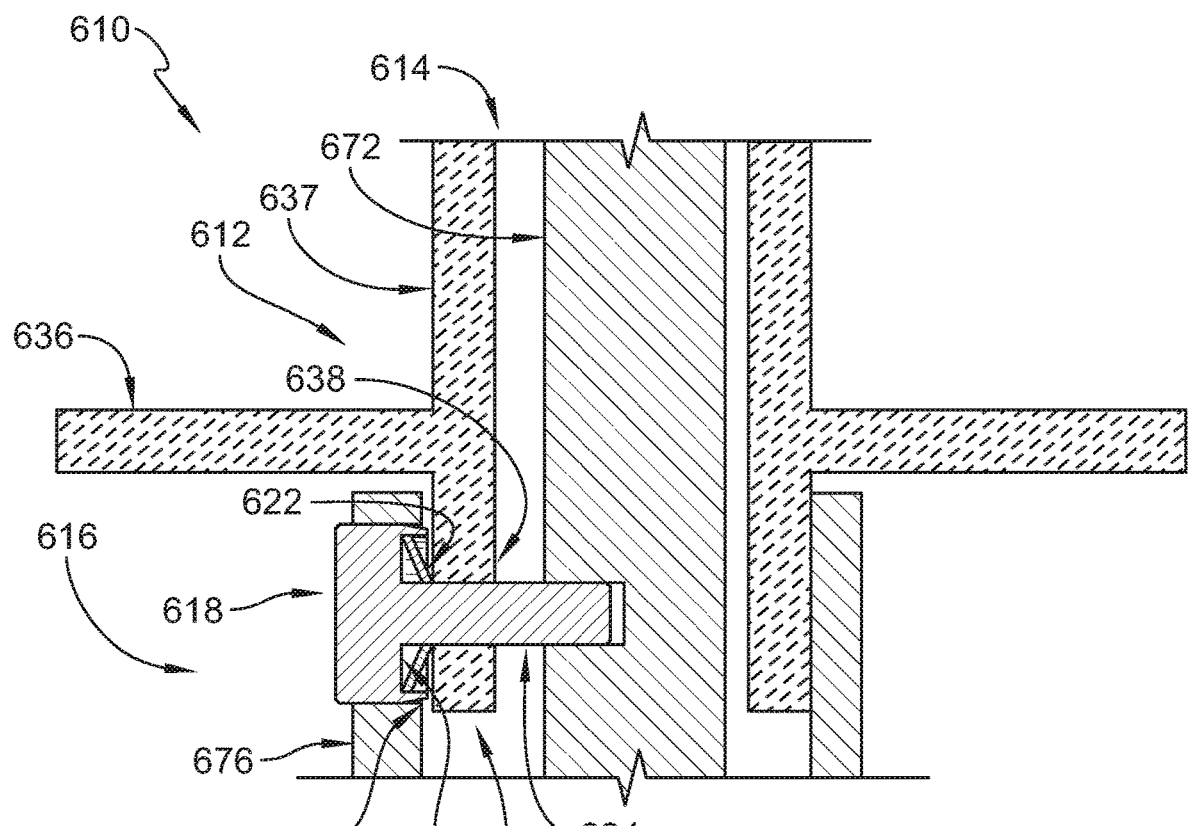
FIG. 15 is a section view of the turbine assembly of FIG. 14 taken along line 15-15 showing the mounting insert includes a body that extends through a portion of the support structure, a protrusion that extends away from the insert body at an outer perimeter edge of the insert body to form a rim that extends around the insert body to define the receiving space, a bias member located in the receiving space, and a shaft that extends axially from the insert body through the support structure and the turbine vane.

Another embodiment of a turbine assembly 610 in accordance with the present disclosure is shown in FIGS. 14 and 15. The turbine assembly 610 is substantially similar to the turbine assembly 10 shown in FIGS. 1-5 and described herein. Accordingly, similar reference numbers in the 600 series indicate features that are common between the turbine assembly 10 and the turbine assembly 610. The description of the turbine assembly 10 is incorporated by reference to apply to the turbine assembly 610, except in instances when it conflicts with the specific description and the drawings of the turbine assembly 610.

The turbine assembly 610 includes a vane 612, a carrier 614, and a mounting insert 616 as shown in FIGS. 14 and 15. The vane 612 defines a portion of the gas path boundary of the turbine assembly 610. The carrier or support structure 614 supports the vane 612 in position radially relative to the axis 11. The mounting inserts 616 are coupled with the carrier 614 and engaged with the vane 612 to bias the vane 612 into engagement with the carrier 614 with a predetermined force load.

The vane 612 includes an outer end wall 635, an inner end wall 636, and an airfoil 637 as show in FIGS. 14 and 15. The outer end wall 635 extends circumferentially at least partway about the axis 11 and defines a portion of the gas path 17 of the gas turbine engine 110. The inner end wall 636 is spaced apart radially from the outer end wall 635 relative to the axis 11 and defines another portion of the gas path 17. The airfoil 637 extends between the outer and inner end walls 635, 636 and is configured to direct hot gases flowing through the gas path 17.

The carrier 614 includes outer and inner walls 647, 648, a spar 672, an outer collar 674, and an inner collar 676 as shown in FIGS. 14 and 15. The outer and inner walls 647, 648 extend circumferentially at least partway about the axis 11. The outer wall 647 is coupled with the engine case. The spar 672 extends radially between the outer and inner walls 647, 648. The outer collar 674 extends radially inward from the outer wall 647 and forms a channel 623 that receives a portion of the vane 612. The inner collar 676 extends radially outward from the inner wall 648 and forms a channel 623 that receives an inner mount post 638 of the vane 612.

In the illustrative embodiment, the turbine assembly 610 includes outer and inner mounting inserts 616 as shown in FIG. 14. The outer mounting insert 616 is fixed with the outer collar 674 and engages the vane 612. The inner mounting insert 616 is fixed with the inner collar 676 and engages inner mount post 638 of the vane 612. In the illustrative embodiment, the inner mounting insert 616 is shown in FIG. 15, however, the same arrangement may be used for the outer mounting insert 616.

The mounting insert 616 includes an insert body 618, a protrusion 620, a bias member 622, and a shaft 624 as shown in FIG. 15. The insert body 618 is fixed to the inner collar 676 of the carrier 614. The protrusion 620 extends axially between a first end 630 coupled with the insert body 618 and a second end 632 engaged with the vane 612. The protrusion 620 defines a receiving space 634 between the first end 630 and the second end 632 of the protrusion 620. The bias member 622 is located in the receiving space 634 and engaged with the insert body 618 and the inner mount post 638 to apply the force load to the vane 612. The shaft 624 extends axially from the insert body 618 through the inner mount post 638 and into the spar 672. The mounting insert 616 can be similar to any of the mounting inserts 16, 216, 316, 416, 516.

In the illustrative embodiment, the shaft 624 extends into a blind hole 662 formed in the spar 672 as shown in FIG. 15. The blind hole 662 is sized to receive the shaft 624. The shaft 624 acts as an anti-rotation feature, blocking twisting of the vane 612 relative to the carrier 614.

Figure 16:
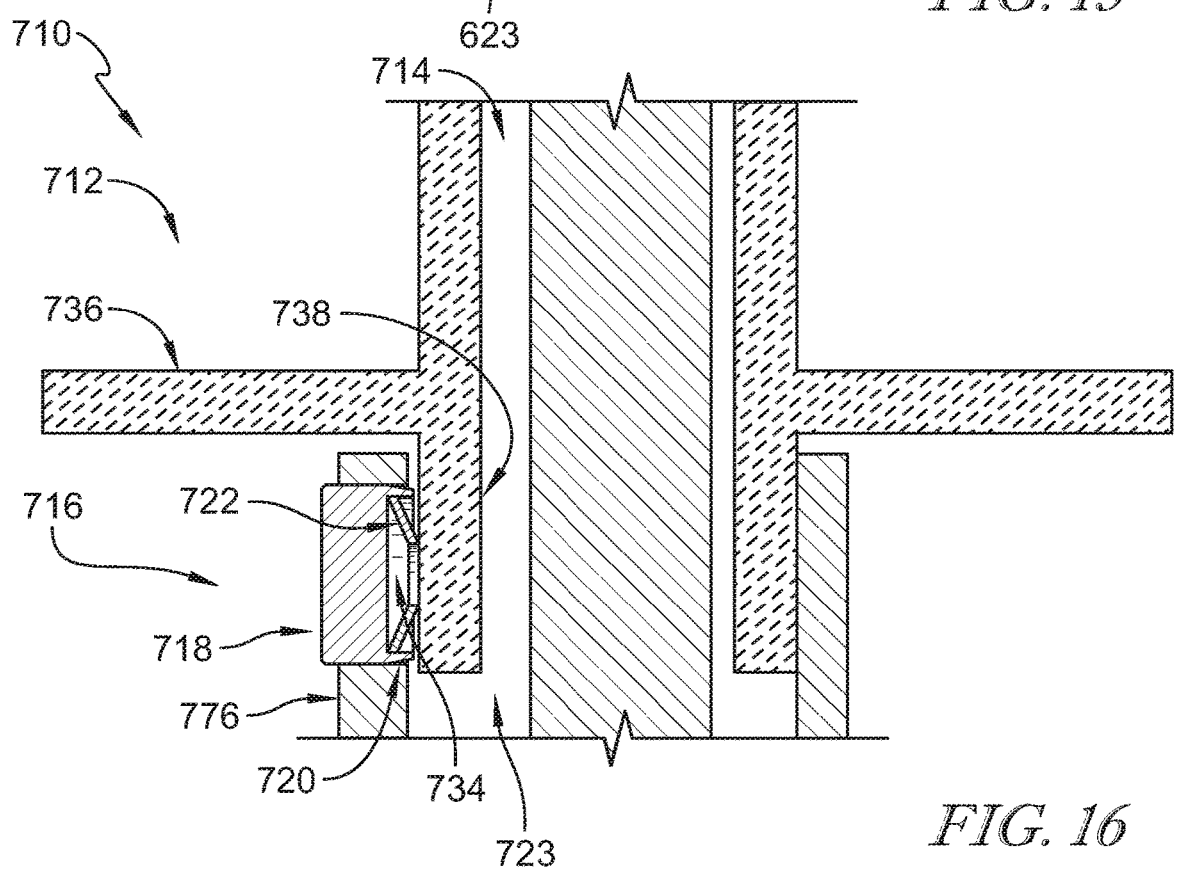
FIG. 16 is a section view similar to FIG. 15 of another turbine assembly showing the turbine assembly includes a turbine vane, a support structure, and a mounting insert that includes an insert body that extends through a portion of the support structure, a protrusion that extends away from the insert body at an outer perimeter edge of the insert body to form a rim that extends around the insert body to define a receiving space, and a bias member located in the receiving space.

Another embodiment of a turbine assembly 710 in accordance with the present disclosure is shown in FIG. 16. The turbine assembly 710 is substantially similar to the turbine assembly 10 shown in FIGS. 1-5 and described herein. Accordingly, similar reference numbers in the 700 series indicate features that are common between the turbine assembly 10 and the turbine assembly 710. The description of the turbine assembly 10 is incorporated by reference to apply to the turbine assembly 710, except in instances when it conflicts with the specific description and the drawings of the turbine assembly 710.

The turbine assembly 710 includes a vane 712, a carrier 714, and a mounting insert 716 as shown in FIG. 16. The vane 712 defines a portion of the gas path boundary of the turbine assembly 710. The carrier 714 supports the vane 712 in position radially relative to the axis 11. The mounting insert 716 is coupled with the carrier 714 and engaged with the vane 712 to bias the vane 712 into engagement with the carrier 714 with a predetermined force load.

The mounting insert 716 includes an insert body 718, a protrusion 720, and a bias member 722 as shown in FIG. 15. The insert body 718 is fixed to the inner collar 776 of the carrier 714. The protrusion 720 extends axially between a first end 730 coupled with the insert body 718 and a second end 732 engaged with the vane 712. The protrusion 720 defines a receiving space 734 between the first end 730 and the second end 732 of the protrusion 720. The bias member 722 is located in the receiving space 734 and engaged with the insert body 718 and the mount post 738 to apply the force load to the vane 712. In the illustrative embodiment, no portion of the mounting insert 716 extends through the mount post 738.

The present disclosure relates to methods and apparatuses for supporting a first component 12, 212, 312, 412, 512, 612, 712 with a second component 14, 2114, 314, 414, 514, 614, 714 using spring or compression forces to interlock the components. In the illustrative embodiments, the present disclosure teaches a mounting insert 16, 216, 316, 416, 516, 616, 716 that is coupled with the second component 14, 2114, 314, 414, 514, 614, 714 and engaged with the first component 12, 212, 312, 412, 512, 612, 712 to bias the first component 12, 212, 312, 412, 512, 612, 712 into engagement with the second component 14, 2114, 314, 414, 514, 614, 714 with a predetermined force load.

The mounting insert 16, 216, 316, 416, 516, 616, 716 is formed to include a receiving space 34, 234, 334, 434, 534, 634, 734 that receives a bias member 22, 222, 322, 422, 522, 622, 722. The bias member is located in the receiving space 34, 234, 334, 434, 534, 634, 734 and engaged with the first component 12, 212, 312, 412, 512, 612, 712 to apply the force load to the first component 12, 212, 312, 412, 512, 612, 712. The force load is configured to limit axial movement of the first component 12, 212, 312, 412, 512, 612, 712 relative to the second component 14, 2114, 314, 414, 514, 614, 714.

The receiving space 34, 234, 334, 434, 534, 634, 734 has a predetermined axial length L1 that controls an amount of compression of the bias member 22, 222, 322, 422, 522, 622, 722 so that the force load applied by the bias member 22, 222, 322, 422, 522, 622, 722 is within a predetermined force threshold range. The predetermined force threshold range ensures the bias member 22, 222, 322, 422, 522, 622, 722 applies a minimum amount of compression force that prevents movement of the first component 12, 212, 312, 412, 512, 612, 712 relative to the second component 14, 2114, 314, 414, 514, 614, 714, but limits the maximum force of the bias member 22, 222, 322, 422, 522, 622, 722 so as not to damage the components of turbine assembly 10, 210, 310, 410, 510, 610, 710. The predetermined force threshold as it relates to the spring compression is illustrated in FIG. 17.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine assembly adapted for use in a gas turbine engine, the turbine assembly comprising
a seal segment comprising ceramic matrix composite materials, the seal segment including a shroud wall that extends circumferentially partway around an axis to define a gas path boundary of the turbine assembly and a mount post that extends radially outward away from the shroud wall,
a carrier comprising metallic materials and configured to support the seal segment in position radially relative to the axis, the carrier including an outer wall that extends circumferentially at least partway about the axis, a first attachment flange that extends radially inward from the outer wall, and a second attachment flange that extends radially inward from the outer wall and spaced apart axially from the first attachment flange to define a radially inwardly opening channel that receives the mount post of the seal segment, and
a mounting insert coupled with the carrier and engaged with the mount post of the seal segment to bias the seal segment into engagement with the carrier with a predetermined force, the mounting insert including an insert body fixed to the first attachment flange, a protrusion that extends axially between a first end coupled with the insert body and a second end engaged with the mount post of the seal segment to define a receiving space between the first end and the second end of the protrusion, and a bias member located in the receiving space and engaged with the insert body and the mount post to apply a force to the mount post and limit axial movement of the seal segment relative to the carrier,
wherein the receiving space has a predetermined axial length between the first end and the second end of the protrusion to control an amount of compression of the bias member between the insert body and the mount post so that the force applied by the bias member to the seal segment is within a predetermined force threshold range.

2. The turbine assembly of claim 1, wherein the first attachment flange of the carrier is shaped to include a through hole and the insert body extends into the through hole to fix the insert body to the first attachment flange.

3. The turbine assembly of claim 2, wherein the protrusion extends around an outer perimeter edge of the insert body to form a rim around the insert body.

4. The turbine assembly of claim 3, wherein the mounting insert further includes a shaft that extends axially from the insert body through the first attachment flange and the mount post and into the second attachment flange to interlock the seal segment with the carrier.

5. The turbine assembly of claim 4, wherein the protrusion includes a rigid member that extends from the insert body toward the mount post and a fugitive member located axially between the rigid member and the mount post of the seal segment.

6. The turbine assembly of claim 1, wherein the protrusion is spaced apart from an outer perimeter edge of the insert body.

7. The turbine assembly of claim 6, wherein the mounting insert further includes a rim that extends around the outer perimeter edge of the insert body, the bias member is arranged around the protrusion, and the rim has an axial rim length that is less than the predetermined axial length so that the rim is spaced apart axially from the mount post.

8. The turbine assembly of claim 7, wherein the mounting insert further includes a shaft that extends axially from the protrusion through the first attachment flange and the mount post and into the second attachment flange to interlock the seal segment with the carrier.

9. The turbine assembly of claim 1, wherein the second attachment flange includes a radially extending wall and a contact pad that extends axially from the radially extending wall toward the first attachment flange and engages the mount post of the seal segment.

10. The turbine assembly of claim 9, wherein the mounting insert further includes a shaft that extends from the protrusion through the first attachment flange and the mount post and into the contact pad of the second attachment flange.

11. A turbine assembly adapted for use in a gas turbine engine, the turbine assembly comprising
a first component,
a second component, and
a mounting insert that includes an insert body fixed to the second component, a protrusion that extends away from the insert body toward the first component to a terminal end of the protrusion that is engaged with the first component to define a receiving space having a predetermined length between the insert body and the terminal end of the protrusion, and a bias member located in the receiving space and engaged with the insert body and the first component,
wherein the second component includes an outer wall that extends circumferentially at least partway about an axis, a first attachment flange that extends radially away from the outer wall, and a second attachment flange that extends radially away from the outer wall and is spaced apart from the first attachment flange to define a channel that receives the first component.

12. The turbine assembly of claim 11, wherein the mounting insert is interference fit with the second component.

13. The turbine assembly of claim 11, wherein the protrusion is arranged around an outer perimeter edge of the insert body.

14. The turbine assembly of claim 13, wherein the mounting insert further includes a shaft that extends from the insert body through the second component and the first component to interlock the first component with the second component.

15. The turbine assembly of claim 13, wherein the protrusion includes a rigid member coupled with the insert body and a fugitive member coupled with the rigid member and engaged with the first component.

16. The turbine assembly of claim 11, wherein the protrusion is spaced apart from an outer perimeter edge of the insert body.

17. The turbine assembly of claim 16, wherein the mounting insert further includes a rim arranged around the outer perimeter edge of the insert body and the rim is spaced apart from the first component.

18. The turbine assembly of claim 11, wherein the first component is a turbine vane, the second component is a support structure coupled with the turbine vane, and the mounting insert is coupled with the support structure and engaged with the turbine vane.

19. A method comprising
providing a first component, a second component, and a mounting insert, the mounting insert including an insert body that extends into the second component, a protrusion that extends from a first surface of the insert body toward the first component and terminates at a second surface to define a receiving space therebetween, and a bias member,
locating the bias member in the receiving space,
locating the first component in a channel formed in the second component,
inserting the mounting insert into the second component so that the protrusion and the bias member engage the first component, and
fixing the insert body to the second component.

* * * * *